(12) United States Patent  (10) Patent No.: US 7,834,917 B2
Kinoshita et al.  (45) Date of Patent: Nov. 16, 2010

(54) IMAGING APPARATUS, NOISE REDUCTION APPARATUS, NOISE REDUCTION METHOD, AND NOISE REDUCTION PROGRAM

(75) Inventors: Hiroyuki Kinoshita, Tokyo (JP); Jing Zhang, Tokyo (JP); Masahiro Ito, Kanagawa (JP); Akira Matsui, Kanagawa (JP)

(73) Assignee: Sony Corporation (JP)

( * ) Notice: Subject to any disclaimer, the term of this patent is extended or adjusted under 35 U.S.C. 154(b) by 835 days.

(21) Appl. No.: 11/665,037

(22) PCT Filed: Aug. 9, 2006

(86) PCT No.: PCT/JP2006/016062
§ 371 (c)(1),
(2), (4) Date: Apr. 10, 2007

(87) PCT Pub. No.: WO2007/020930
PCT Pub. Date: Feb. 22, 2007

(65) Prior Publication Data
US 2009/0033773 A1  Feb. 5, 2009

(30) Foreign Application Priority Data
Aug. 15, 2005  (JP) .............................. 2005-235469

(51) Int. Cl.
*H04N 5/217* (2006.01)
(52) U.S. Cl. ...................................... 348/241; 382/262
(58) Field of Classification Search ........................ None
See application file for complete search history.

(56) References Cited

U.S. PATENT DOCUMENTS

| 5,533,149 | A | * | 7/1996 | Kaplan et al. | ................ | 382/260 |
| 5,748,796 | A | * | 5/1998 | Pennino et al. | ............. | 382/254 |
| 6,229,578 | B1 | * | 5/2001 | Acharya et al. | ............. | 348/607 |

(Continued)

FOREIGN PATENT DOCUMENTS

JP  06-086104 A  3/1994

(Continued)

*Primary Examiner*—Jason Whipkey
*Assistant Examiner*—Dennis Hogue
(74) *Attorney, Agent, or Firm*—Lerner, David, Littenberg, Krumholz & Mentlik, LLP

(57) ABSTRACT

Noise reduction is performed on the basis of characteristics of an image in a detection range. A noise reduction block 4' performs a second-order differentiation process and a symmetry process to decide adjacent pixels with which noise reduction is preformed for an attention pixel. With the pixel level of the attention pixel in the detection range and the pixel levels of adjacent pixels used for noise reduction, an arithmetic mean processing section 16 calculates a mean value. A median filter 17 selects a median value. With the number of pixels used for noise reduction, it is determined whether the image in the detection range contains a flat portion, a ramp portion, or an edge. The mean value and the median value are weight-added with a weighted coefficient that are changed on the basis of characteristics of the image. The result is substituted for the level of the attention pixel. When the attention pixel is an isolated point, an all-pixel median filter section 31 selects a medium value of the levels of all the pixels in the detection range including the attention pixel and substitutes the median value for the level of the attention pixel.

46 Claims, 21 Drawing Sheets

U.S. PATENT DOCUMENTS

| | | | |
|---|---|---|---|
| 6,665,448 B1 * | 12/2003 | Maurer | 382/261 |
| 7,027,172 B1 * | 4/2006 | Parulski et al. | 358/1.15 |
| 2004/0120601 A1 * | 6/2004 | Ruol et al. | 382/275 |

FOREIGN PATENT DOCUMENTS

| | | |
|---|---|---|
| JP | 06-260889 A | 9/1994 |
| JP | 06-315104 A | 11/1994 |
| JP | 2004-166010 A | 6/2004 |
| JP | 2004-214756 A | 7/2004 |
| JP | 2005-117449 A | 4/2005 |

* cited by examiner

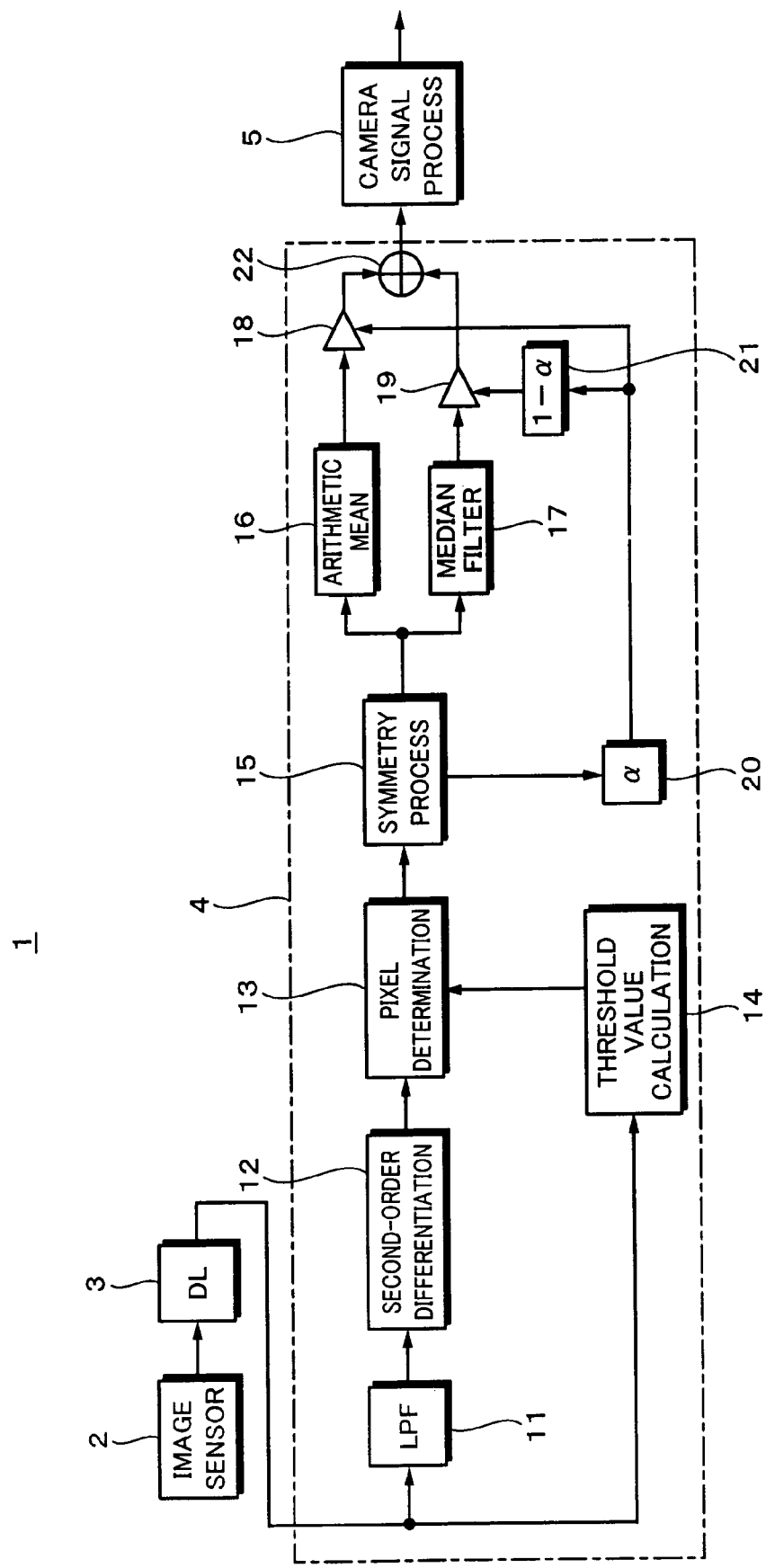

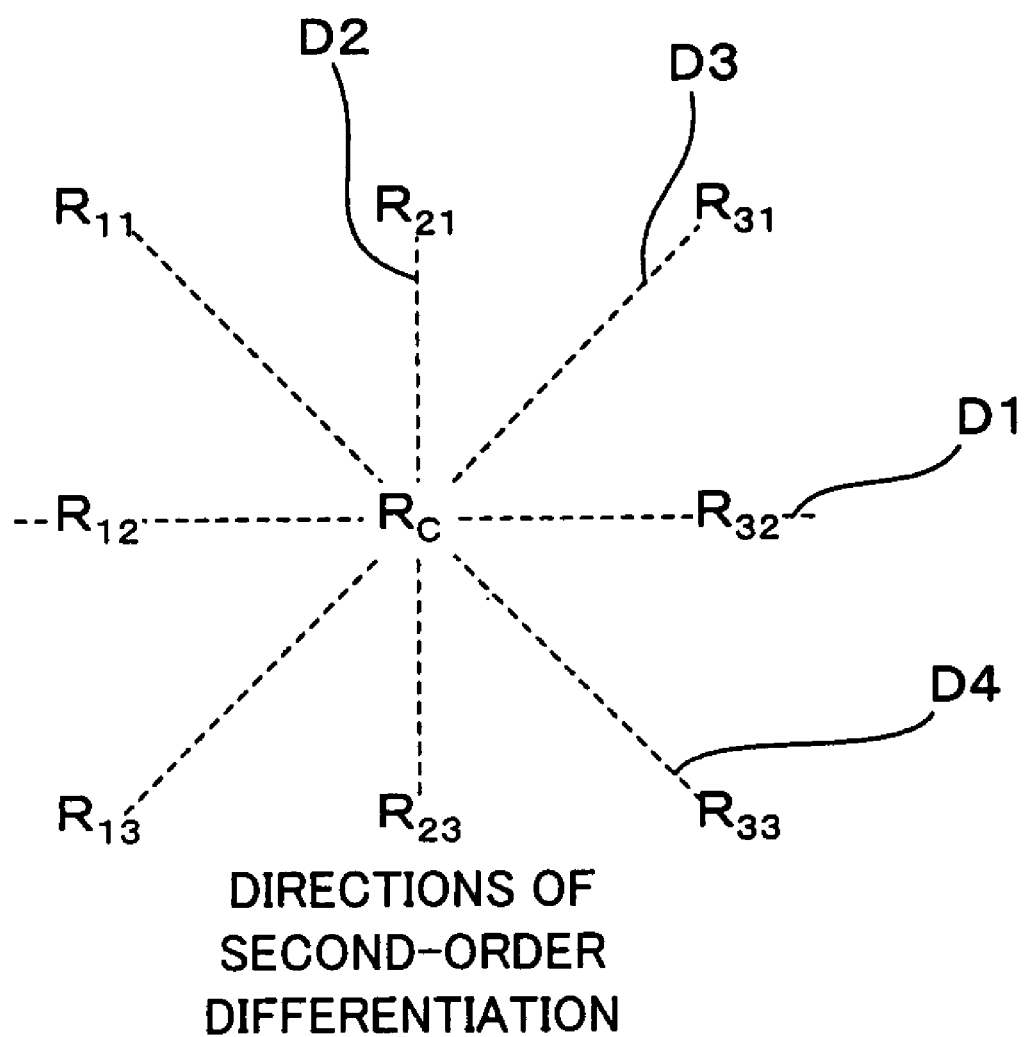

(FLAT PORTION)

(RAMP PORTION)

(FLAT PORTION WITH NOISE)

(RAMP PORTION WITH NOISE)

(EDGE IS PRESENT BETWEEN PIXELS A AND C)

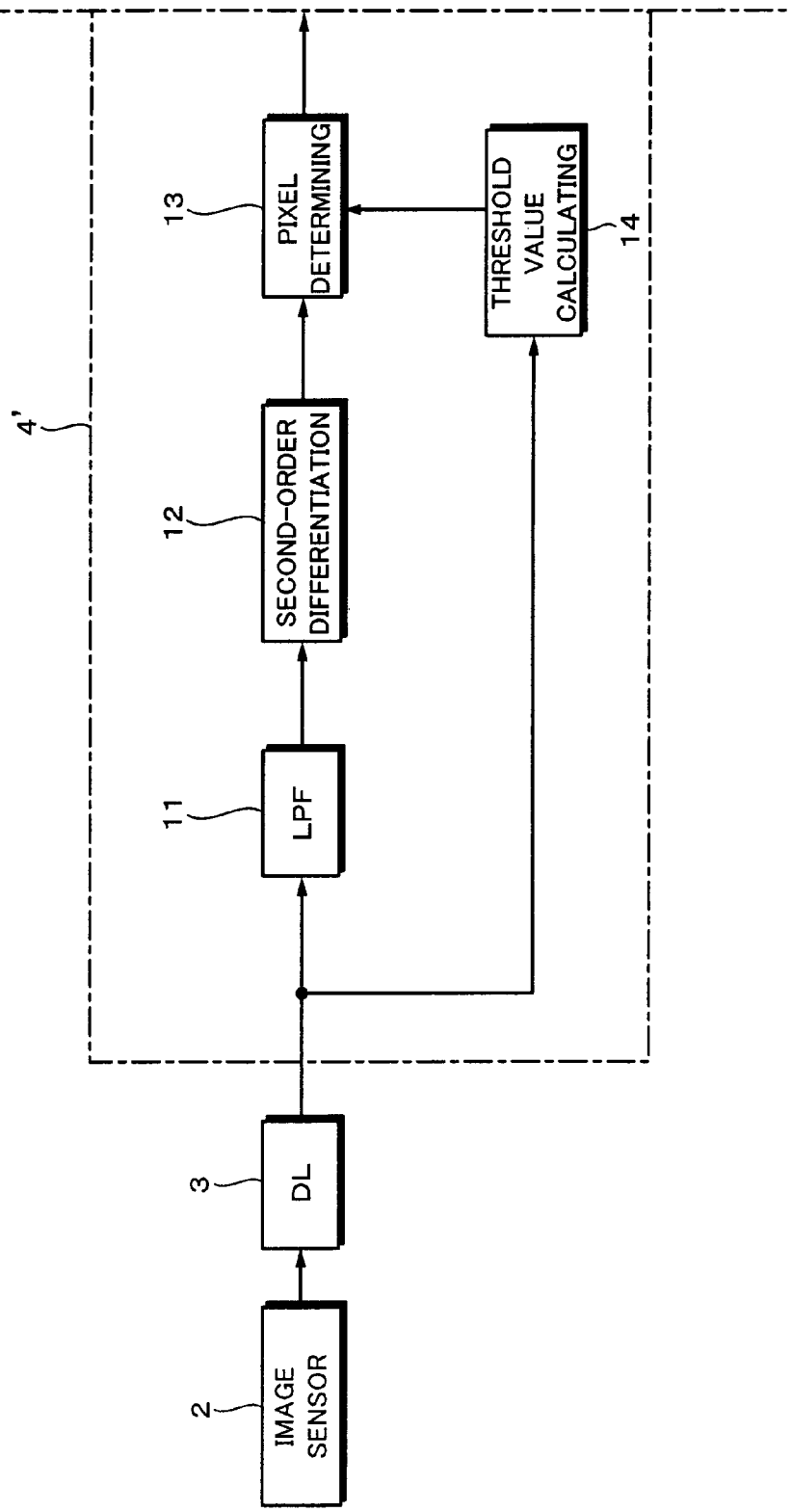

IMAGING APPARATUS, NOISE REDUCTION APPARATUS, NOISE REDUCTION METHOD, AND NOISE REDUCTION PROGRAM

The present application is a national stage of PCT/JP2006/316062 filed Aug. 9, 2006, which claims priority from Japanese Patent Application No. JP 2005-235469 filed in the Japanese Patent Office on Aug. 15, 2005, the entire contents of which are incorporated herein by reference.

TECHNICAL FIELD

The present invention relates to an imaging apparatus, a noise reduction apparatus, a noise reduction method, and a noise reduction program, in particular to those which allow noise contained in a video signal, a picture signal and an image signal to be effectively removed.

BACKGROUND ART

The number of pixels of an image sensor disposed in an imaging apparatus has been remarkably increased in recent years. The resolution of the imaging device has been improved to the level of a smooth granularity which human's eyes cannot recognize. Under such circumstances, requirements for picture quality have been changed from higher resolution to reduction of a sense of noise. To reduce a sense of noise, an imaging apparatus performs noise reduction (a noise reduction process) for an image signal captured by an image sensor.

A noise reduction apparatus which performs the noise reduction using epsilon ($\epsilon$) filtering is described in a patent document disclosed as Japanese Patent Application Unexamined Publication No. HEI 6-86104.

Next, with reference to FIG. 1A and FIG. 1B, the noise reduction using the $\epsilon$ filtering will be described. FIG. 1A shows pixel levels of a plurality of adjacent pixels (these levels may be also referred to as pixel values) in a flat portion of an image. In this example, it is assumed that an attention pixel 101 as an object used for noise reduction, three adjacent pixels 102, 103, and 104 on the left thereof, and three adjacent pixels 105, 106, and 107 on the right thereof are designated as a detection region so as to smoothen these pixels. In this example, it is assumed that the attention pixel 101 and the adjacent pixel 102 to adjacent pixel 107 are pixels of the same color component.

The pixel level of each of the adjacent pixel 102 to adjacent pixel 107 in the detection region in the non-noise state is different from the pixel level of the corresponding pixel in the noise state (this difference is referred to as level difference). This level difference is indicated as noise. When the absolute value of the level difference of the attention pixel 101 and each of the adjacent pixels in the detection region is within a threshold value which is designated as the pixel value of the attention pixel 101, it can be determined that the adjacent pixel 102 to adjacent pixel 107 be able to be used for the noise reduction. A filter process is performed by calculating a mean value of the pixel values of the attention pixel 101 and the adjacent pixel 102 to adjacent pixel 107 (this calculation may be referred to as calculation of arithmetic mean). In the example shown in FIG. 1A, the detection region is in the left and right directions of the attention pixel 101. However, as long as the detection region is plane, it may be in the upper and lower directions, left diagonal directions, and/or right diagonal directions of the attention pixel 101.

In the noise reduction using the $\epsilon$ filtering, it is determined that when the absolute value of the difference of the pixel levels of an attention pixel and an adjacent pixel in a detection region is within a predetermined threshold value, they be correlated with respect to a signal component. The arithmetic mean of the pixel levels of the attention pixel and the adjacent pixels determined to be correlated with the attention pixel is calculated. On the other hand, in the noise reduction using the $\epsilon$ filtering, a pixel whose pixel level is largely different from that of an attention pixel for example an edge portion (contour portion) is not used. Thus, in a flat portion of an image shown in FIG. 1A, the noise reduction can be performed in such a manner that an edge does not become dull and deterioration of frequency characteristics is suppressed as much as possible.

However, the foregoing noise reduction of the related art has the following problems. FIG. 1B shows pixel levels of pixels in a ramp portion of an image of which the pixel levels of the pixels gradually vary on a plane. As shown in FIG. 1B, among a plurality of adjacent pixels in a detection region, only an adjacent pixel 204 and an adjacent pixel 205 are pixels whose absolute value of the level difference against an attention pixel does not exceed a threshold value. Thus, when a ramp portion of an image is smoothened with the attention pixel 201 and the adjacent pixels 204 and 205, the number of pixels to be used to calculate the arithmetic mean is smaller than that in the flat portion of the image. As a result, the effect of the noise reduction in the ramp portion is not sufficient. In addition, when the arithmetic mean process is performed with the pixel levels of the attention pixel and its adjacent pixels, the frequency characteristics of an output image deteriorate. This does not result in a serious problem in a flat portion of an image. However, in a high frequency region of an image, when noise is removed, frequency characteristics deteriorate and thereby the output image becomes dull.

When an image contains both a flat portion and a ramp portion, although the effect of the noise reduction for the flat portion is obtained, that for the ramp portion is not sufficient. As a result, a sense of noise becomes strong in the ramp portion. In addition, in the noise reduction of the related art, depending on adjacent pixels used for noise reduction, the center of gravity of an attention pixel is moved after the noise reduction is performed. As a result, the linearity of the image remarkably deteriorates. In addition, if an attention pixel contains sharp noise for example impulse-shaped noise, the effect of the noise reduction cannot be expected.

In addition, the noise reduction is performed for an attention pixel and its adjacent pixels of the same color component. However, depending on a color filter used for the image sensor, the number of adjacent pixels having the same color component as the attention pixel may be decreased. For example, when a color filter having three primary color signals (R (Red), G (Green), and B (Blue)) is used, with consideration of visibility characteristics of human's eyes, the color filter has more G filters than R filters and B filters. Thus, the numbers of R filters and B filters are relatively smaller than the number of G filters. As a result, if an attention pixel used for the noise reduction is for example the R component, it is necessary to widen the detection region so that the number of pixels of the R component is increased. However, in this case, since the detection region is widened, it is necessary to increase the storage capacity of a line memory. Thus, the circuit scale adversely increases. In addition, when the detection region is widened, the correlation between an attention pixel and its adjacent pixels may become weak, resulting in deteriorating the effect of the noise reduction.

DISCLOSURE OF THE INVENTION

Thus, an object of the present invention is to provide an imaging apparatus, a noise reduction apparatus, a noise reduction method, and a noise reduction program that allow noise reduction to be performed for both a flat portion and a ramp portion of an image.

Another object of the present invention is to provide an imaging apparatus, a noise reduction apparatus, a noise reduction method, and a noise reduction program which allow noise reduction to be performed in the case that the number of pixels of the same color component is small in a detection region.

To solve the foregoing problem, a first aspect of the present invention is an imaging apparatus having an imaging section and a noise reduction device which performs noise reduction for an image signal obtained from the imaging section, the noise reduction device comprising extracting means for extracting an attention pixel used for the noise reduction and a plurality of adjacent pixels of the same color component as the attention pixel; edge detecting means for detecting whether there is an edge between the attention pixel and the plurality of adjacent pixels; determining means for determining that the adjacent pixels be able to be used for the noise reduction when the edge detecting means has not detected an edge and determining that the adjacent pixels be not able to be used for the noise reduction when the edge detecting means has detected an edge; first processing means for performing a noise reduction process for a pixel value of the attention pixel and pixel values of the adjacent pixels determined to be able to be used for the noise reduction by the determining means; second processing means for performing the noise reduction process for the pixel value of the attention pixel and the pixel values of the adjacent pixels determined to be able to be used for the noise reduction by the determining means while frequency characteristics are kept; and weighted adding means for adding an output value of the first processing means and an output value of the second processing means with a weighted coefficient.

A second aspect of the present invention is a noise reduction apparatus, comprising extracting means for extracting an attention pixel used for the noise reduction and a plurality of adjacent pixels of the same color component as the attention pixel; edge detecting means for detecting whether there is an edge between the attention pixel and the plurality of adjacent pixels; determining means for determining that the adjacent pixels be able to be used for the noise reduction when the edge detecting means has not detected an edge and determining that the adjacent pixels be not able to be used for the noise reduction when the edge detecting means has detected an edge; first processing means for performing a noise reduction process for a pixel value of the attention pixel and a pixel value of the adjacent pixel determined to be able to be used for the noise reduction by the determining means; second processing means for performing the noise reduction process for the pixel value of the attention pixel and the pixel values of the adjacent pixels determined to be able to be used for the noise reduction by the determining means while frequency characteristics are kept; and weighted adding means for adding an output value of the first processing means and an output value of the second processing means with a weighted coefficient.

A third aspect of the present invention is a noise reduction method, comprising the steps of extracting an attention pixel used for the noise reduction and a plurality of adjacent pixels of the same color component as the attention pixel; detecting whether there is an edge between the attention pixel and the plurality of adjacent pixels; determining that the adjacent pixels be able to be used for the noise reduction when an edge has not been detected at the edge detecting step and determining that the adjacent pixels be not able to be used for the noise reduction when an edge has been detected at the edge detecting step; performing a noise reduction process for a pixel value of the attention pixel and a pixel value of the adjacent pixel determined to be able to be used for the noise reduction at the determining step; performing the noise reduction process for the pixel value of the attention pixel and the pixel values of the adjacent pixels determined to be able to be used for the noise reduction at the determining step while frequency characteristics are kept; and adding an output value at the first processing step and an output value at the second processing step with a weighted coefficient.

A fourth aspect of the present invention is a program which causes a computer to execute a noise reduction method, comprising the steps of extracting an attention pixel used for the noise reduction and a plurality of adjacent pixels of the same color component as the attention pixel; detecting whether there is an edge between the attention pixel and the plurality of adjacent pixels; determining that the adjacent pixels be able to be used for the noise reduction when an edge has not been detected at the edge detecting step and determining that the adjacent pixels be not able to be used for the noise reduction when an edge has been detected at the edge detecting step; performing a noise reduction process for a pixel value of the attention pixel and a pixel value of the adjacent pixel determined to be able to be used for the noise reduction at the determining step; performing the noise reduction process for the pixel value of the attention pixel and the pixel values of the adjacent pixels determined to be able to be used for the noise reduction at the determining step while frequency characteristics are kept; and adding an output value at the first processing step and an output value at the second processing step with a weighted coefficient.

A fifth aspect of the present invention is an imaging apparatus having an imaging section and a noise reduction device which performs noise reduction for an image signal obtained from the imaging section, the noise reduction device comprising extracting means for extracting an attention pixel used for the noise reduction and a plurality of adjacent pixels of the same color component as the attention pixel; edge detecting means for detecting whether there is an edge between the attention pixel and the plurality of adjacent pixels; determining means for determining that the adjacent pixels be able to be used for the noise reduction when the edge detecting means has not detected an edge and determining that the adjacent pixels be not able to be used for the noise reduction when the edge detecting means has detected an edge; isolated point determining means for determining whether the attention pixel is an isolated point; first processing means for performing a noise reduction process with the pixel value of the attention pixel and the pixel values of the adjacent pixels determined to be able to be used for the noise reduction by the determining means; second processing means for performing the noise reduction process with the pixel value of the attention pixel and the pixel values of the adjacent pixels determined to be able to be used for the noise reduction by the determining means while frequency characteristics are kept; weighted adding means for adding an output value of the first processing means and an output value of the second processing means with a weighted coefficient, and third processing means for performing the noise reduction process with the pixel value of the attention pixel, the pixel values of the adjacent pixels determined to be able to be used for the noise reduction by the determining means, and the pixel values of the adjacent pixels determined to be not able to be used for the noise reduction by the determining means while keeping frequency characteristics, wherein when the isolated point determining means has determined that the attention pixel be not the isolated point, an output value of the weighted adding means is substituted for the pixel value of the attention pixel and the substituted value is output and when the isolated point determination means has determined that the attention pixel be the isolated point, an output value of the third processing means is substituted for the pixel value of the attention pixel and the substituted value is output.

A sixth aspect of the present invention is a noise reduction apparatus, comprising extracting means for extracting an attention pixel used for the noise reduction and a plurality of adjacent pixels of the same color component as the attention pixel; edge detecting means for detecting whether there is an edge between the attention pixel and the plurality of adjacent pixels; determining means for determining that the adjacent pixels be able to be used for the noise reduction when the edge detecting means has not detected an edge and determining that the adjacent pixels be not able to be used for the noise reduction when the edge detecting means has detected an edge; isolated point determining means for determining whether the attention pixel is an isolated point; first processing means for performing a noise reduction process with the pixel value of the attention pixel and the pixel values of the adjacent pixels determined to be able to be used for the noise reduction by the determining means; second processing means for performing the noise reduction process with the pixel value of the attention pixel and the pixel values of the adjacent pixels determined to be able to be used for the noise reduction by the determining means while frequency characteristics are kept; weighted adding means for adding an output value of the first processing means and an output value of the second processing means with a weighted coefficient, and third processing means for performing the noise reduction process with the pixel value of the attention pixel, the pixel values of the adjacent pixels determined to be able to be used for the noise reduction by the determining means, and the pixel values of the adjacent pixels determined to be not able to be used for the noise reduction by the determining means while keeping frequency characteristics, wherein when the isolated point determining means has determined that the attention pixel be not the isolated point, an output value of the weighted adding means is substituted for the pixel value of the attention pixel and the substituted value is output and when the isolated point determination means has determined that the attention pixel be the isolated point, an output value of the third processing means is substituted for the pixel value of the attention pixel and the substituted value is output.

A seventh aspect of the present invention is a noise reduction method, comprising the steps of extracting an attention pixel used for the noise reduction and a plurality of adjacent pixels of the same color component as the attention pixel; detecting whether there is an edge between the attention pixel and the plurality of adjacent pixels; determining that the adjacent pixels be able to be used for the noise reduction when an edge has not been detected at the edge detecting step and determining that the adjacent pixels be not able to be used for the noise reduction when an edge has been detected at the edge detecting step; determining whether the attention pixel is an isolated point; performing a noise reduction process with the pixel value of the attention pixel and the pixel values of the adjacent pixels determined to be able to be used for the noise reduction at the determining step; performing the noise reduction process with the pixel value of the attention pixel and the pixel values of the adjacent pixels determined to be able to be used for the noise reduction at the determining step while frequency characteristics are kept; adding an output value at the first processing step and an output value at the second processing step with a weighted coefficient, and performing the noise reduction process with the pixel value of the attention pixel, the pixel values of the adjacent pixels determined to be able to be used for the noise reduction at the determining step, and the pixel values of the adjacent pixels determined to be not able to be used for the noise reduction at the determining step while keeping frequency characteristics, wherein when it has been determined that the attention pixel be not the isolated point at the isolated point determining step, an output value at the weighted adding step is substituted for the pixel value of the attention pixel and the substituted value is output and when it has been determined that the attention pixel be the isolated point at the isolated point determination step, an output value at the third processing step is substituted for the pixel value of the attention pixel and the substituted value is output.

An eighth aspect of the present invention is a program which causes a computer to execute a noise reduction method, comprising the steps of extracting an attention pixel used for the noise reduction and a plurality of adjacent pixels of the same color component as the attention pixel; detecting whether there is an edge between the attention pixel and the plurality of adjacent pixels; determining that the adjacent pixels be able to be used for the noise reduction when an edge has not been detected at the edge detecting step and determining that the adjacent pixels be not able to be used for the noise reduction when an edge has been detected at the edge detecting step; determining whether the attention pixel is an isolated point; performing a noise reduction process with the pixel value of the attention pixel and the pixel values of the adjacent pixels determined to be able to be used for the noise reduction at the determining step; performing the noise reduction process with the pixel value of the attention pixel and the pixel values of the adjacent pixels determined to be able to be used for the noise reduction at the determining step while frequency characteristics are kept; adding an output value at the first processing step and an output value at the second processing step with a weighted coefficient, and performing the noise reduction process with the pixel value of the attention pixel, the pixel values of the adjacent pixels determined to be able to be used for the noise reduction at the determining step, and the pixel values of the adjacent pixels determined to be not able to be used for the noise reduction at the determining step while keeping frequency characteristics, wherein when it has been determined that the attention pixel be not the isolated point at the isolated point determining step, an output value at the weighted adding step is substituted for the pixel value of the attention pixel and the substituted value is output and when it has been determined that the attention pixel be the isolated point at the isolated point determination step, an output value at the third processing step is substituted for the pixel value of the attention pixel and the substituted value is output.

As described above, in the first, second, third, and fourth aspects of the present invention, an attention pixel used for noise reduction and a plurality of adjacent pixels of the same color component as the attention pixel are extracted. It is detected whether there is an edge between the attention pixel and the plurality of adjacent pixels. It is determined that the adjacent pixels be able to be used for the noise reduction when an edge has not been detected. In addition, it is determined that the adjacent pixels be not able to be used for the noise reduction when an edge has been detected. An output value of a noise reduction process performed with the pixel value of the attention pixel and the pixel values of the adjacent pixels determined to be able to be used for the noise reduction and an output value of a noise reduction process performed with the pixel value of the attention pixel and the pixel values of the adjacent pixels determined to be able to be used for the noise reduction while frequency characteristics are kept are added with a weighted coefficient. Thus, noise reduction for an attention pixel can be properly performed.

In the fifth, sixth, seventh, and eighth aspects of the present invention, an attention pixel used for noise reduction and a plurality of adjacent pixels of the same color component as the attention pixel are extracted. It is detected whether there is an edge between the attention pixel and the plurality of adjacent pixels. It is determined that the adjacent pixels be able to be used for the noise reduction when an edge has not been detected. It is determined that the adjacent pixels be not able to be used for the noise reduction when an edge has been detected. It is determined whether the attention pixel is an isolated point. An output of a noise reduction process performed with the pixel value of the attention pixel and the pixel values of the adjacent pixels determined to be able to be used for the noise reduction and an output value of a noise reduction process performed with the pixel value of the attention pixel and the pixel values of the adjacent pixels determined to be able to be used for the noise reduction while frequency characteristics are kept are added with a weighted coefficient. A noise reduction process is performed with the pixel value of the attention pixel, the pixel values of the adjacent pixels determined to be able to be used for the noise reduction, and the pixel values of the adjacent pixels determined to be not able to be used for the noise reduction while keeping frequency characteristics. When it has been determined that the attention pixel be not the isolated point, an output value at the weighted adding step is substituted for the pixel value of the attention pixel and the substituted value is output. When it has been determined that the attention pixel be the isolated point at the isolated point determination step, an output value at the noise reduction process performed with the pixel value of the attention pixel, the pixel values of the adjacent pixels determined to be able to be used for the noise reduction, and the pixel values of the adjacent pixels determined to be not able to be used for the noise reduction while keeping frequency characteristics is substituted for the pixel value of the attention pixel and the substituted value is output. Thus, even if an attention pixel is an isolated point, noise reduction can be properly performed for it.

According to the first, second, third, and fourth aspects of the present invention, an effect of noise reduction can be obtained for an attention pixel used for the noise reduction. In addition, an effect of noise reduction can be obtained without variations in any of a flat portion and a ramp portion of an image. Moreover, an effect of noise reduction can be obtained for a pixel in the case that the number of pixels of the same color component is small in a detection region.

According to the fifth, sixth, seventh, and eighth aspects of the present invention, an effect of noise reduction can be obtained for an attention pixel used for the noise reduction. In addition, an effect of noise reduction can be obtained without variations in any of a flat portion and a ramp portion of an image. Moreover, an effect of noise reduction can be obtained for a pixel in the case that the number of pixels of the same color component is small in a detection region. In addition, even if an attention pixel is an isolated point, noise reduction can be properly performed.

BRIEF DESCRIPTION OF DRAWINGS

FIG. 2 is a block diagram showing the structure of an imaging apparatus according to an embodiment of the present invention;

FIG. 7 is a schematic diagram showing directions of second-order differentiation according to an embodiment of the present invention;

FIG. 18A and FIG. 18B are block diagrams showing an example of the structure of an imaging apparatus according to a modification of an embodiment of the present invention;

BEST MODES FOR CARRYING OUT THE INVENTION

Figure 1A:
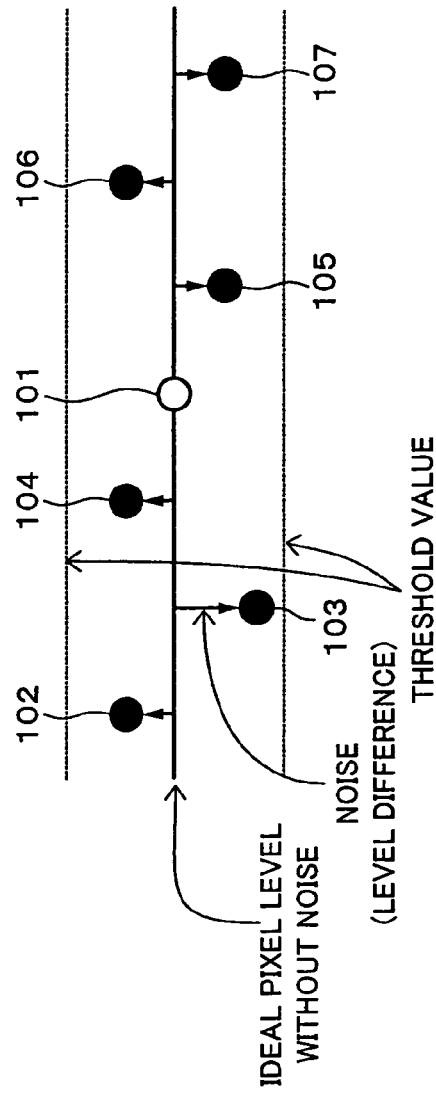
FIG. 1A and FIG. 1B are schematic diagrams describing an ε filter process of related art.
Figure 1B:
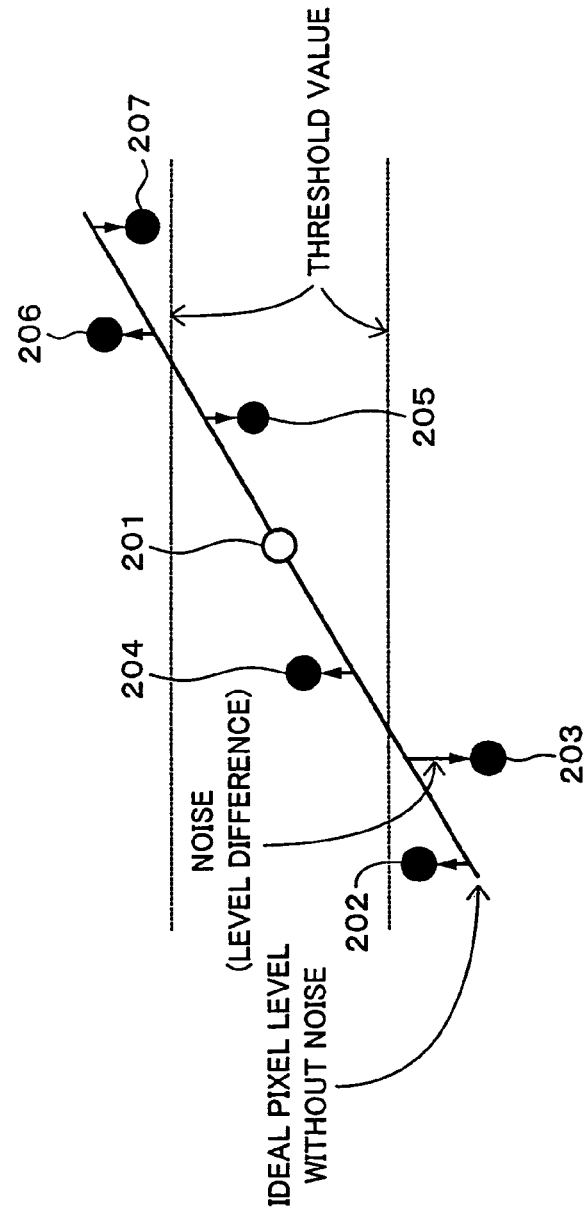

Next, with reference to the accompanying drawings, an embodiment of the present invention will be described. FIG. 2 shows a principal structure of an imaging apparatus 1 according to an embodiment of the present invention. The imaging apparatus 1 includes an image sensor 2, a delay line block 3, a noise reduction processing block 4, and a camera signal processing block 5.

The image sensor 2 is for example a Complementary Metal Oxide Semiconductor (CMOS) sensor. The image sensor 2 converts light collected by an optical system (including a lens, an infrared ray elimination filter, an optical low-pass filter, and so forth) (not shown) into an electric signal. Two-dimensionally arranged on the CMOS sensor 2 are for example photo diodes, line and row selection MOS transistors, signal lines, and so forth which compose a vertical scanning circuit, a horizontal scanning circuit, a noise reduction circuit, a timing generation circuit, and so forth. According to this embodiment, the image sensor 2 is described as a CMOS sensor. Instead, the image sensor 2 may be a Charge Coupled Device (CCD).

An image signal which is output from the CMOS sensor 2 is supplied to the delay line block 3. The noise reduction process which will be described later uses any number of line inputs which have been delayed in the vertical direction. Thus, the delay line block 3 performs a line delaying process.

An image signal delayed by the delay line block 3 is supplied to the noise reduction processing block 4. The noise reduction processing block 4 performs noise reduction for an attention pixel in a designated detection region.

An image signal which is output from the noise reduction processing block 4 is supplied to the camera signal processing block 5. The camera signal processing block 5 is composed of for example one chip IC. The camera signal processing block 5 performs for example an Auto Focus (AF), an Auto Exposure (AE), a white balance process, a gamma compensation, a knee compensation, and so forth. When necessary, the camera signal processing block 5 performs a resolution converting process to convert the resolution of an input image signal. The camera signal processing block 5 performs the foregoing signal processes, generates a luminance signal and color difference signals, and outputs the generated signals.

The camera signal processing block 5 may be disposed at the immediately upstream stage of the noise reduction processing block 4. In other words, the noise reduction processing block 4 may perform noise reduction for the luminance signal and color difference signals which are output from the camera signal processing block 5.

Instead, a plurality of noise reduction processing blocks 4 may be disposed. When a plurality of noise reduction processing blocks 4 are disposed, a plurality of detection regions may be designated for an arrangement of pixels of the image sensor. As a result, noise reduction may be performed for the plurality of attention pixels in the detection regions in parallel.

Next, an example of the structure of the noise reduction processing block 4 according to this embodiment of the present invention will be described. The noise reduction processing block 4 includes a Low Pass Filter (LPF) 11, a second-order differentiation processing section 12, a pixel determining section 13, a threshold value calculating section 14, a symmetry processing section 15, an arithmetic mean processing section 16, a median filter 17, a multiplying device 18, a multiplying device 19, a weighted coefficient generating section 20, a weighted coefficient generating section 21, and an adding device 22.

The LPF 11 performs a smoothing process in directions perpendicular to directions of the second-order differentiation which the second-order differentiation processing section 12 performs. In addition, when necessary, the LPF 11 performs an interpolating process. The smoothing process and the interpolating process which the LPF 11 performs allow impulse-shaped noise contained in an image signal supplied to the noise reduction processing block 4 to be removed.

The second-order differentiation processing section 12 which is an example of edge detecting means performs a second-order differentiation for the pixel level of an attention pixel and the pixel levels of its adjacent pixels of the same color component in a detection region. The absolute value of a value obtained by the second-order differentiation process (this absolute value may be hereinafter referred to as a second-order differentiated value) is supplied to the pixel determining section 13 which is an example of determining means. Supplied to the pixel determining section 13 is also threshold value information calculated by the threshold value calculating section 14.

The pixel determining section 13 compares the second-order differentiated value obtained in the second-order differentiation process with the threshold value supplied from the threshold value calculating section 14. When the second-order differentiated value is equal to or smaller than the threshold value, it is determined that the adjacent pixels be able to be used for the noise reduction. In contrast, when the second-order differentiated value is larger than the threshold value, it is determined that the adjacent pixels be not able to be used for the noise reduction.

The result of the determining process of the pixel determining section 13 is supplied to the symmetry processing section 15. The symmetry processing section 15 determines whether the adjacent pixels determined to be able to be used for the noise reduction by the pixel determining section 13 are point-symmetrical with respect to the attention pixel. The symmetry processing section 15 determines that the adjacent pixels which are point-symmetrical with respect to the attention pixel be pixels which are able to be used for the noise reduction. The process performed in the symmetry processing section 15 may be performed in the pixel determining section 13.

The symmetry processing section 15 performs the symmetry determining process to determine that the adjacent pixels be able to be used for the noise reduction. The arithmetic mean processing section 16 which is an example of first processing means performs an arithmetic mean process for the pixel level of the attention pixel and the pixel levels of the adjacent pixels determined to be able to be used for the noise reduction. The arithmetic mean processing section 16 performs the arithmetic mean process to calculate an arithmetic mean by adding the pixel level of the attention pixel and the pixel levels of the adjacent pixels determined to be able to be used for the noise reductions and dividing the sum of the pixel levels by the number of pixels. The obtained value (hereinafter sometimes referred to as an arithmetic mean value) is output from the arithmetic mean processing section 16 and supplied to the multiplying device 18.

The median filter 17 which is an example of second processing means selects a nearly median value of the pixel level of the attention pixel and the pixel levels of the adjacent pixels determined to be able to be used for the noise reduction. The selected value of the pixel level (hereinafter sometimes referred to as a median value) is output from the median filter 17 and supplied to the multiplying device 19.

After the symmetry processing section 15 has determined the adjacent pixels which are able to be used for the noise reduction, information about the number of pixels which are able to be used for the noise reduction (hereinafter sometimes referred to as the number of pixels used for the noise reduction) is supplied to the weighted coefficient generating section 20. The number of pixels used for the noise reduction is the sum of the number of the adjacent pixels determined to be able to be used for the noise reduction by the symmetry processing section 15 and the attention pixel.

The weighted coefficient generating section 20 adaptively determines the value of a weighted coefficient α (where 0≦α≦1) corresponding to for example the number of pixels used for the noise reduction supplied from the symmetry processing section 15. The value of the weighted coefficient α determined in the weighted coefficient generating section 20 is supplied to the multiplying device 18 (the weighted coefficient α may be hereinafter sometimes referred to as the coefficient α). In addition, the weighted coefficient generating section 21 calculates a weighted coefficient (1-α) with the value of the coefficient α. The calculated weighted coefficient (1-α) (hereinafter sometimes referred to as the coefficient (1-α)) is supplied to the multiplying device 19.

The multiplying device 18 multiplies the arithmetic mean value which is output from the arithmetic mean processing section 16 by the coefficient α. The value of the multiplied result is supplied to the adding device 22. On the other hand, the multiplying device 19 multiplies the median value which is output from the median filter 17 by the coefficient (1-α). The value of the multiplied result is supplied to the adding device 22.

The adding device 22 adds the value supplied from the multiplying device 18 and the value supplied from the multiplying device 19. The pixel level of the attention pixel is substituted with the value obtained by the adding device 22 and output from the noise reduction processing block 4.

Next, the noise reduction process performed in the noise reduction processing block 4 will be described in detail.

Figure 3:
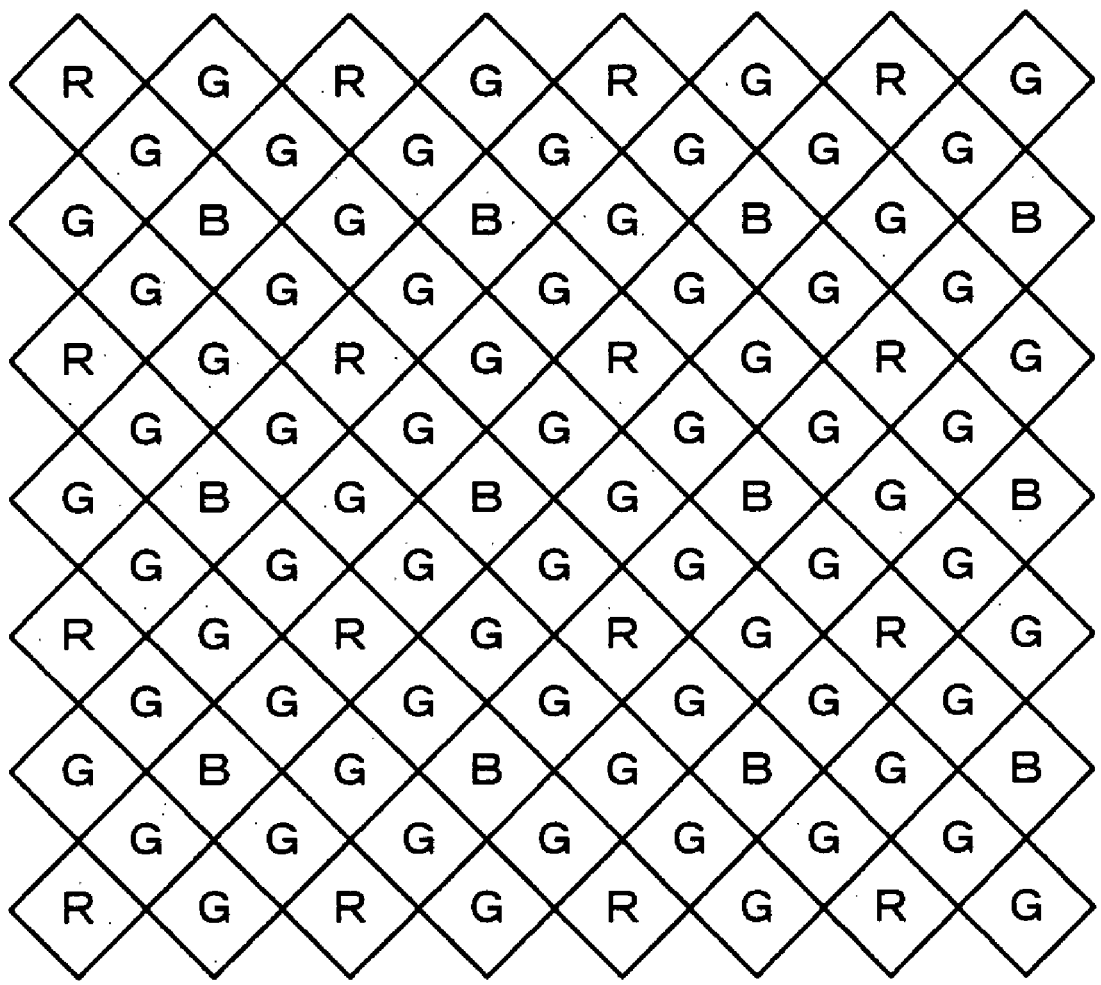
FIG. 3 is a schematic diagram showing an arrangement of a color filter disposed in an image sensor according to an embodiment of the present invention.
Figure 4:
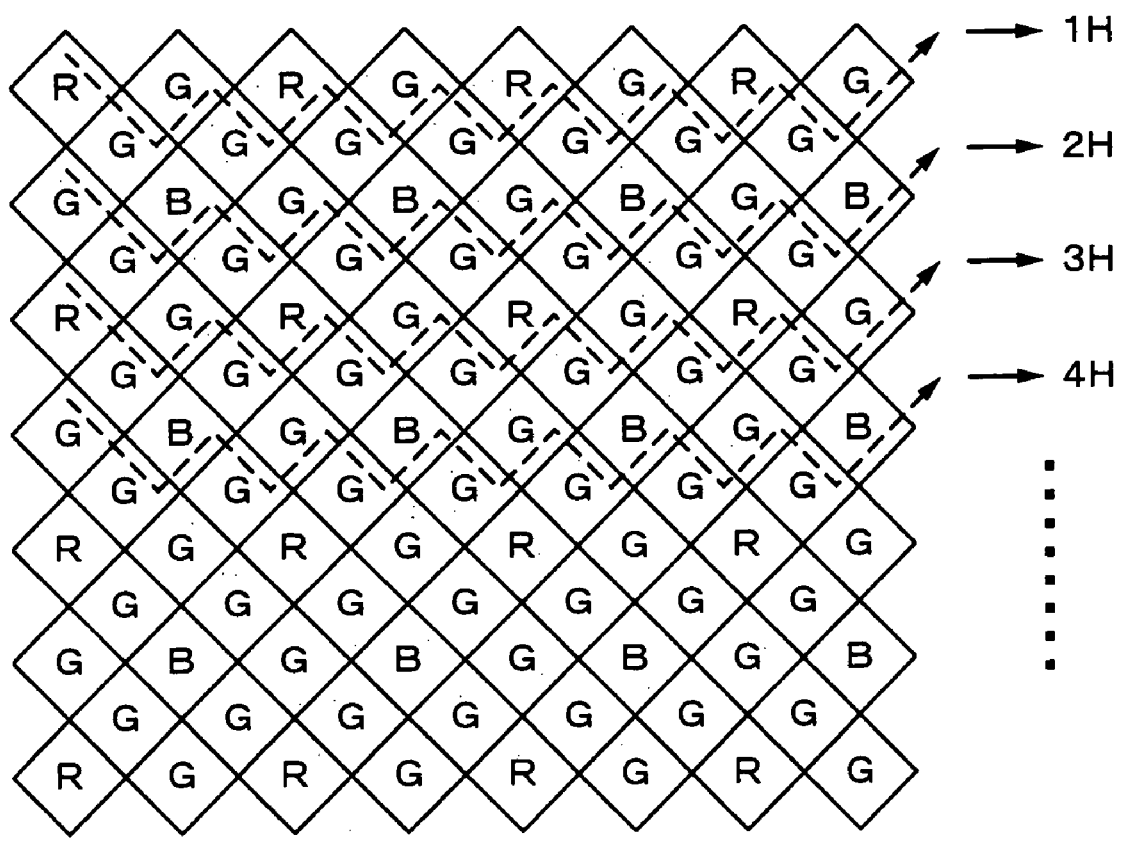
FIG. 4 is a schematic diagram showing a method of reading pixels by the image sensor according to an embodiment of the present invention.

FIG. 3 shows an arrangement of a color filter disposed in the CMOS sensor 2 according to this embodiment of the present invention. The color filter shown in FIG. 3 has an arrangement of which a square lattice array is inclined by 45 degrees and each of R and B filters is surrounded by G filters. This structure allows sufficient spatial frequency characteristics for R and B color components to be obtained with respect to visibility characteristics of human's eyes and spatial frequency characteristics for G color component which are higher than those for R and B color components, the sensibility of human's eyes for the G color component is higher than that for the R and B color components, to be higher than those of the Bayer arrangement of related art. The G component is a major component for a luminance signal to be generated. Thus, the luminance resolutions of not only an achromatic color object, but a chromatic color object are improved and thereby the image quality is improved.

In the arrangement of the color filter shown in FIG. 3, as denoted by dot-arrow lines, two pixels are alternately read from two adjacent lines in one horizontal synchronous interval. In other words, when there is only one output channel, pixels of the two adjacent lines are alternately scanned and read.

Figure 5:
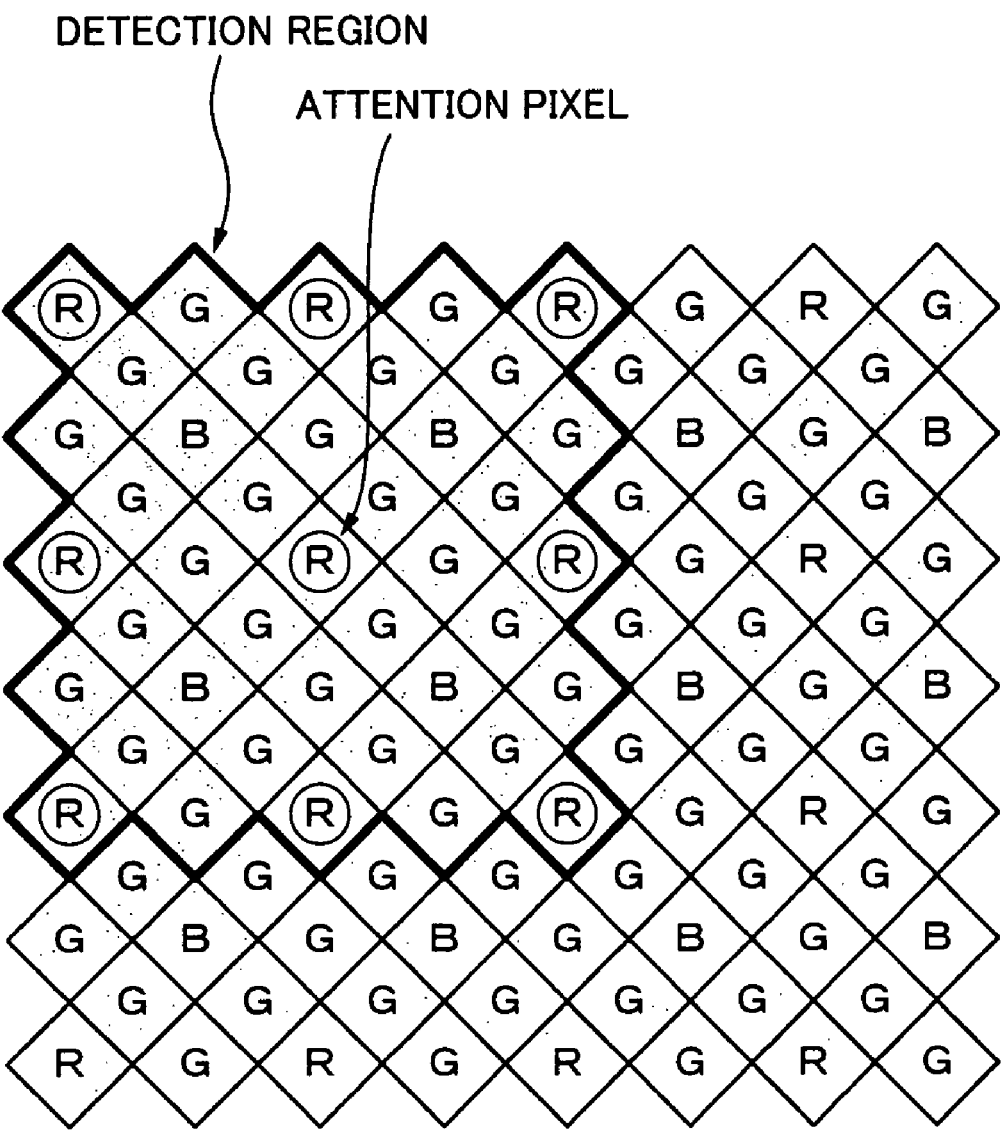
FIG. 5 is a schematic diagram showing a detection region according to an embodiment of the present invention.

FIG. 5 shows an example of a detection region designated in the foregoing color filter of the image sensor 2. Since the color filter has many G filters whose sensitivity of human's eyes is higher than that of R and B filters, the numbers of pixels of R and B color components in the detection region are small. For example, in the detection region surrounded by solid lines of FIG. 5, there are only eight adjacent pixels of the R color component around an attention pixel of the same color component. When the number of adjacent pixels of the same color component is small, the effect of the noise reduction of the arithmetic mean process may deteriorate. Thus, according to this embodiment of the present invention, in parallel with the median filter process, the arithmetic mean process is performed. The result of the arithmetic mean process and the result of the median filter process are multiplied by weighted coefficients and the products are added. Thus, even if the number of pixels of the same color component in the detection region is small, the effect of the noise reduction can be obtained.

Figure 6:
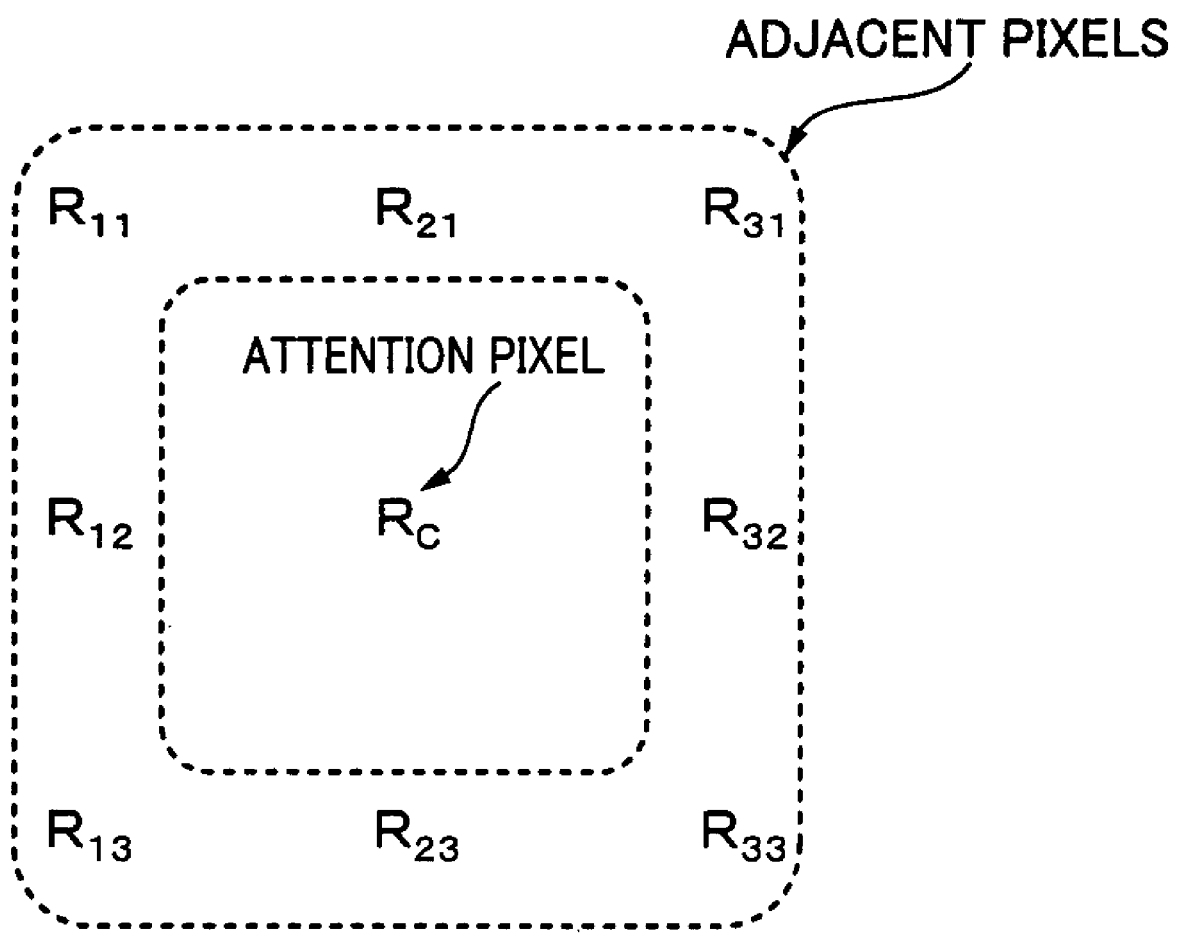
FIG. 6 is a schematic diagram showing pixels of the same color component captured from a detection region.

Each color channel is separated from an image signal captured from the image sensor. FIG. 6 shows pixels of the R color component in the detection region shown in FIG. 5. In FIG. 6, there is an attention pixel Rc used for the noise reduction. In addition, there are an adjacent pixel $R_{11}$, an adjacent pixel $R_{12}$, an adjacent pixel $R_{13}$, an adjacent pixel $R_{21}$, an adjacent pixel $R_{23}$, an adjacent pixel $R_{31}$, an adjacent pixel $R_{32}$, and an adjacent pixel $R_{33}$ around the attention pixel Rc. The size of the detection region can be freely designated.

In addition, the directions of the second-order differentiation for the attention pixel and the adjacent pixels in the detection region are defined. In other words, a total of four directions of second-order differentiation are defined around the attention pixel Rc. These directions are a horizontal direction D1, a vertical direction D2, a diagonal direction D3, and a diagonal direction D4 as shown in FIG. 7.

Figure 8A:
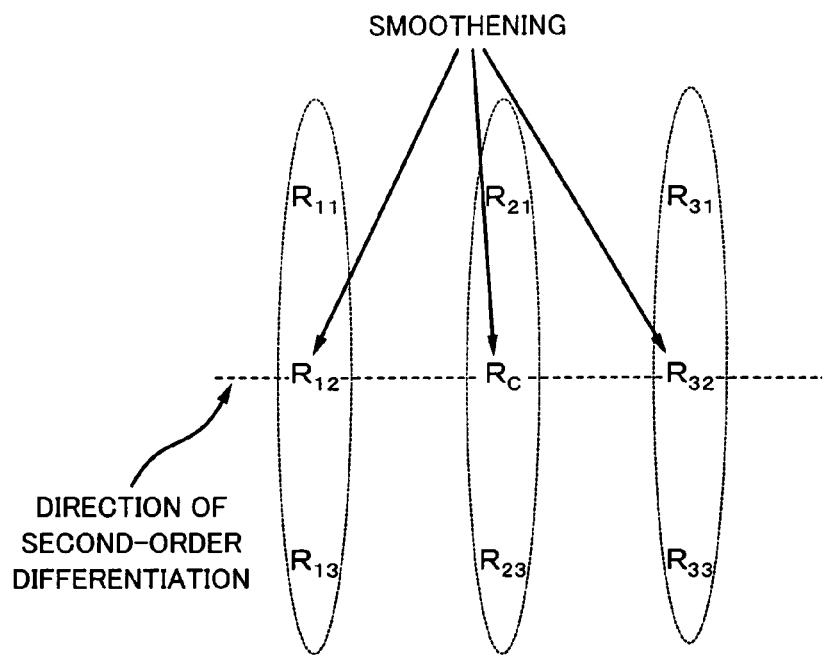
FIG. 8A and FIG. 8B are schematic diagrams describing a smoothing process and an interpolating process according to an embodiment of the present invention.

FIG. 8A shows an example of a smoothening process performed by the LPF 11. The smoothening process is performed in the directions perpendicular to the directions of the second-order differentiation. For example, in the horizontal direction as a direction of the second-order differentiation, an array of the adjacent pixel $R_{11}$, the adjacent pixel $R_{12}$, and the adjacent pixel $R_{13}$, an array of the adjacent pixel $R_{21}$, the adjacent pixel Rc, and the adjacent pixel $R_{23}$, and an array of the adjacent pixel $R_{31}$, the adjacent pixel $R_{32}$, and the adjacent pixel $R_{33}$ are smoothened. Each array is smoothened by adding the pixel levels of the pixels and dividing the sum by the number of pixels. For example, the pixel levels of the adjacent pixel $R_{11}$, the adjacent pixel $R_{12}$, and the adjacent pixel $R_{13}$ are added and then the sum is divided by 3 as the number of adjacent pixels. The resultant value is substituted with the pixel level of the adjacent pixel R12.

Figure 8B:
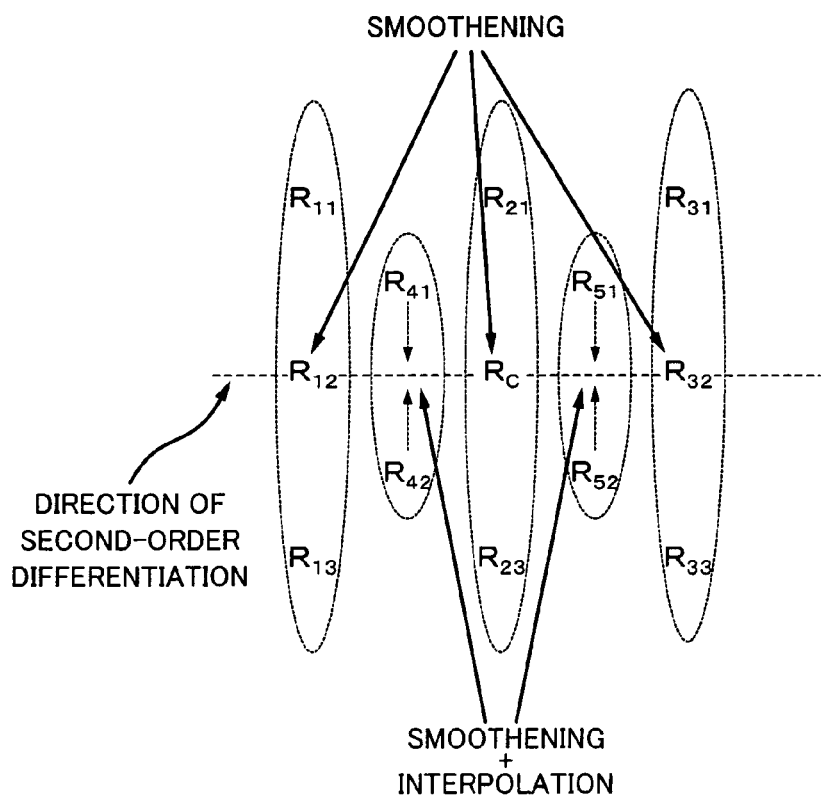

When necessary, the LPF 11 performs an interpolating process. FIG. 8B shows an interpolating process performed by the LPF 11. Depending on the arrangement of the color filter of the image sensor, there may be an adjacent pixel $R_{41}$, an adjacent pixel $R_{42}$, an adjacent pixel $R_{51}$, and an adjacent pixel $R_{52}$ as shown in FIG. 8B. In this case, an arithmetic mean value of pixel values of two pixels is substituted with the pixel level of an interpolated pixel which is absent at a position in the direction of the second-order differentiation. For example, an arithmetic mean value of pixel levels of the adjacent pixel $R_{41}$ and the adjacent pixel $R_{42}$ is calculated as the pixel level of an interpolated pixel.

The LPF 11 also performs a smoothening process (and an interpolating process when necessary) in the directions perpendicular to the directions of the second-order differentiation, namely not only the horizontal direction but also the vertical direction and the diagonal directions. In addition, when the smoothening process is not able to be performed for only pixels in the detection region such as the adjacent pixel $R_{11}$, the adjacent pixel $R_{13}$, the adjacent pixel $R_{31}$, and the adjacent pixel $R_{33}$, pixels outside the detection region may be used. In this case, the smoothening process may not be performed. When the smoothing process is performed by the LPF 11, impulse-shape noise of each pixel can be removed.

Figure 9:
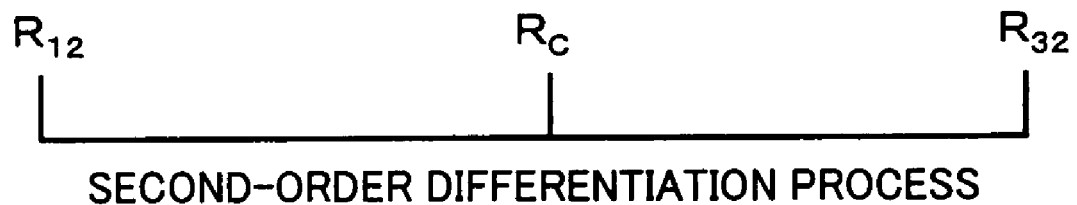
FIG. 9 is a schematic diagram describing a second-order differentiation process according to an embodiment of the present invention.

FIG. 9 shows an array of pixels disposed in for example the horizontal direction which the second-order differentiation processing section 12 performs the second-order differentiation. The second-order differentiation processing section 12 performs the second-order differentiation process for the attention pixel Rc, the adjacent pixel $R_{12}$, and the adjacent pixel $R_{32}$ which have been smoothened. The second-order differentiation process is performed by multiplying the pixel levels of the pixels by coefficients of three taps which are properly designated and adding the products. The coefficients of the three taps may be fixedly designated for example (−1, 2, −1) or adaptively designated.

The second-order differentiated value obtained by the second-order differentiation processing section 12 is supplied to the pixel determining section 13. The pixel determining section 13 compares the second-order differentiated value with a threshold value. The threshold value is supplied from the threshold value calculating section 14. The threshold value calculating section 14 calculates the threshold value on the basis of the pixel level of for example the attention pixel corresponding to the purpose of the noise reduction. Instead, the threshold value may be freely designated. For example, to perform the noise reduction for optical shot noise, the threshold value is designated as an integer multiple of the square root of the pixel level of the attention pixel. To perform the noise reduction for both optical shot noise and random noise, the threshold value is designated as a value of which the square root of the pixel level of the attention pixel is multiplied by a constant and then the product and another constant (a constant or a variable which denotes the random noise level) are added.

The pixel determining section 13 compares the second-order differentiated value with the threshold value. When the second-order differentiated value is equal to or smaller than the threshold value, the pixel determining section 13 determines that there bes no edge between the attention pixel and the adjacent pixels and designates the adjacent pixels as alternatives which are able to be used for the noise reduction. In contrast, when the second-order differentiated value is larger than the threshold value, the pixel determining section 13 determines that there be an edge between the attention pixel and the adjacent pixels and determines the adjacent pixels as pixels which are not able to be used for the noise reduction.

Next, with reference to FIG. 10A, FIG. 10B, FIG. 10C, FIG. 10D, and FIG. 10E, examples of the process performed in the pixel determining section 13 will be described. In FIG. 10A to FIG. 10E, for easy understanding, an attention pixel is denoted by A and adjacent pixels are denoted by B and C. In the examples shown in FIG. 10A to FIG. 10E, the adjacent pixel. B is a pixel with which it is determined whether the adjacent pixels are able to be used for the noise reduction. In this example, the adjacent pixel B is referred to as the determination pixel B.

Figure 10A:
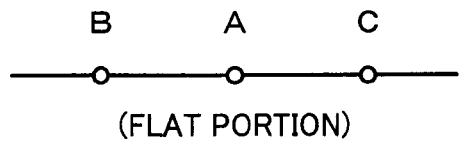
FIG. 10A to FIG. 10E are schematic diagrams describing procedures of the second-order differentiation process according to an embodiment of the present invention.

FIG. 10A shows a case that the attention pixel A, the determination pixel B, and the adjacent pixel C are placed in a flat portion of an image. In this case, when the second-order differentiation is performed for these pixels, the second-order differentiated value becomes 0 (when the first-order differentiation is performed for these pixels, the first-order differentiated value actually becomes 0). Thus, since the second-order differentiated value is smaller than the threshold value, it is determined that the determination pixel B and the adjacent pixel C be correlated with the attention pixel A. As a result, the determination pixel B is an alternative of a pixel which is able to be used for the noise reduction.

Figure 10B:
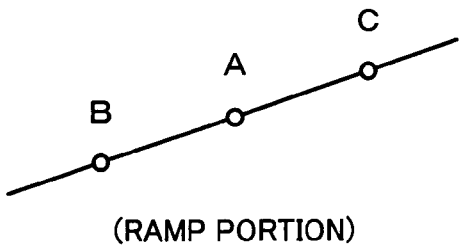

FIG. 10B shows a case that the attention pixel A, the determination pixel B, and the adjacent pixel C are placed in a ramp portion of an image. In this case, when the first-order differentiation is performed for the ramp portion which varies with a first-order function, a constant value corresponding to the slope of the ramp portion is kept. When the second-order differentiation is performed for the constant value, the second-order differentiated value becomes 0. Thus, since the second-order differentiated value is smaller than the threshold value, it is determined that the determination pixel B and the adjacent pixel C be correlated with the attention pixel A. As a result, the determination pixel B is an alternative of a pixel which is able to be used for the noise reduction.

Figure 10C:
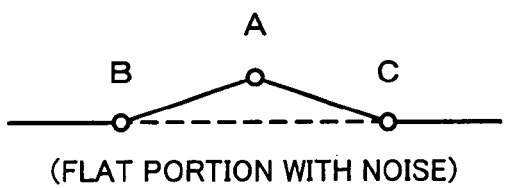
Figure 10D:
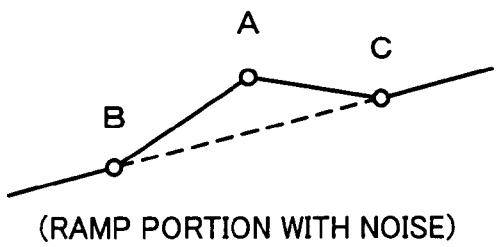

FIG. 10C and FIG. 10D show cases that a pixel in a flat portion of an image and a pixel in a ramp portion of an image contain noise (these pixels are referred to as an attention pixel A). In the cases shown in FIG. 10C and FIG. 10D, although the second-order differentiated value of these pixels is not 0, if the second-order differentiated value is equal to or smaller than the threshold value, it is determined that a noise component have been detected and that the flat portion or ramp portion does not have an edge. In addition, it is determined that the determination pixel B and the adjacent pixel C be correlated with the attention pixel A. As a result, the determination pixel B is an alternative of a pixel which is able to be used for the noise reduction.

Figure 10E:
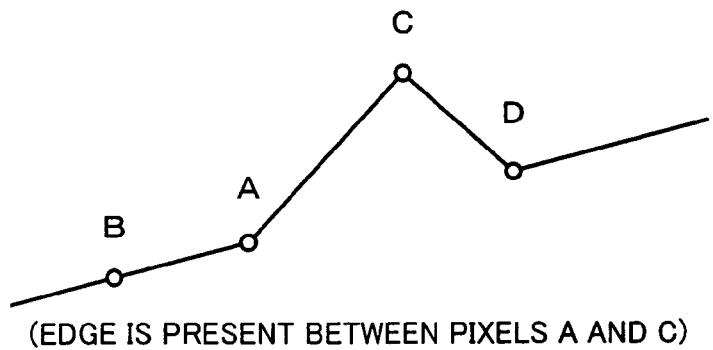

FIG. 10E shows a case that there is an edge between for example the attention pixel A and the adjacent pixel C. Since there is an edge, the difference of the pixel levels of the attention pixel A and the adjacent pixel C becomes large. Thus, the second-order differentiated value is larger than the threshold value which has been properly designated. When the second-order differentiated value is larger than the threshold value, it is determined that there be an edge between the attention pixel and the adjacent pixel. Since an adjacent pixel which crosses an edge is not correlated with an attention pixel, the adjacent pixel is not able to be used for the noise reduction.

FIG. 10E shows that there is an edge between the attention pixel A and the adjacent pixel C. It is determined that the determination pixel B be not able to be used for the noise reduction. This is because in the second-order differentiation process, it is determined that an edge be present either between the attention pixel A and the determination pixel B or between the attention pixel A and the adjacent pixel C. Thus, it is determined that the determination pixel B be not able to be used for the noise reduction. In addition, it is determined that a pixel which crosses a pixel determined to have noise (for example, an adjacent pixel D in FIG. 10E) against the attention pixel be not able to be used for the noise reduction. This is because even if it is determined that the adjacent pixel D which crosses an edge be correlated with the attention pixel A, it is difficult to determine whether the adjacent pixel D is correlated with the attention pixel A because the pixel level of the adjacent pixel D is not able to be distinguished from the real pixel level or a pixel level due to noise. As a result, the determination may be incorrectly made.

As described above, since a second-order differentiated value is compared with the threshold value rather than a level difference unlike the related art, the number of pixels used for the noise reduction can be prevented from being decreased especially in a ramp portion of an image.

Figure 11:
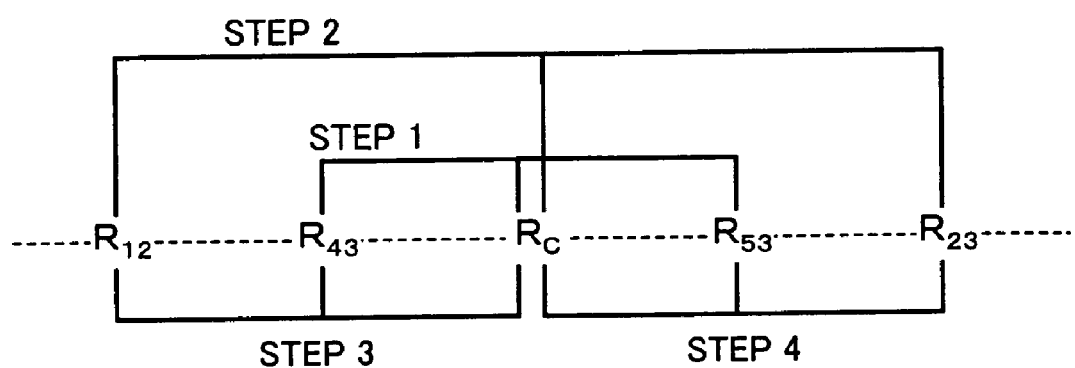
FIG. 11 is a schematic diagram showing a procedure of steps of the second-order differentiation process.

When the second-order differentiation process is performed for adjacent pixels which are placed in the vicinity of (for example, adjacent to) an attention pixel and which are point-symmetrical with respect to the attention pixel, even if the number of adjacent pixels is large, the number of steps of the second-order differentiation process can be decreased. For example, as shown in FIG. 11, a second-order differentiation process is performed for an attention pixel Rc and its adjacent pixels $R_{43}$ and $R_{53}$ which are point-symmetrical with respect to the attention pixel Rc (at step 1). When the second-order differentiation value is larger than the threshold value, it is determined that there be an edge between the attention pixel Rc and the adjacent pixel $R_{43}$ or the adjacent pixel $R_{53}$. In addition, it is determined that the adjacent pixel $R_{12}$ and the adjacent pixel $R_{23}$ which cross the adjacent pixel $R_{43}$ and the adjacent pixel $R_{53}$ in the adjacent pixel $R_{43}$, the adjacent pixel $R_{53}$, and the attention pixel Rc be adjacent pixels which are not able to be used for the noise reduction. In other words, since it can be determined that the adjacent pixel $R_{12}$ and the adjacent pixel $R_{23}$ be adjacent pixels which are not able to be used for the noise reduction without determining whether there is an edge between the adjacent pixel $R_{12}$ and the adjacent pixel $R_{43}$ and between the adjacent pixel $R_{53}$ and the adjacent pixel $R_{23}$, the number of steps of the second-order differentiation process can be decreased. When the second-order differentiated value is smaller than the threshold value, the second-order differentiation process is performed in a combination of for example step 2, step 3, and step 4.

When the interpolating process is performed by the LPF 11, although an interpolated pixel is used for the second-order differentiation process, it is not determined whether the interpolated pixel is able to be used for the noise reduction. In other words, the noise reduction is not performed with an interpolated pixel.

The second-order differentiation process is performed in the vertical direction, the left diagonal direction, and the right diagonal direction as well as the horizontal direction to determine whether each of a plurality of adjacent pixels is an alternative of an adjacent pixel which is able to be used for the noise reduction. Information about the adjacent pixel determined to be able to be used for the noise reduction is supplied to the symmetry processing section 15.

The symmetry processing section 15 determines whether the adjacent pixel as an alternative determined to be able to be used for the noise reduction by the pixel determining section 13 is point-symmetrical with respect to the attention pixel. The symmetry processing section 15 determines that the adjacent pixel which is point-symmetrical with respect to the attention pixel be a adjacent pixel which is able to be used for the noise reduction.

Figure 12:
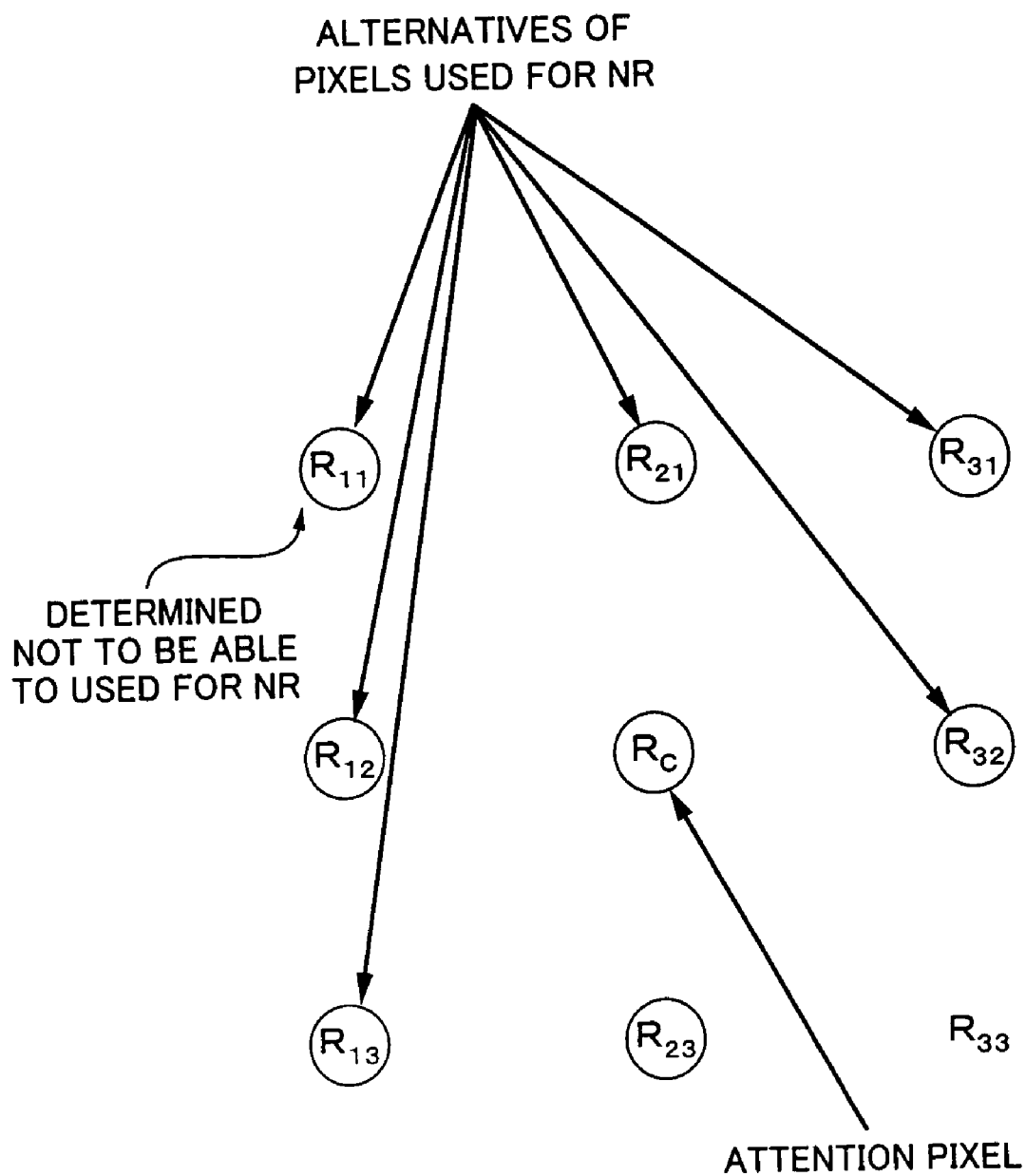
FIG. 12 is a schematic diagram describing a symmetry determining process according to an embodiment of the present invention.

For example, as shown in FIG. 12, it is assumed that the pixel determining section 13 has determined that an adjacent pixel $R_{11}$, an adjacent pixel $R_{12}$, an adjacent pixel $R_{13}$, an adjacent pixel $R_{21}$, an adjacent pixel $R_{23}$, an adjacent pixel $R_{31}$, and an adjacent pixel $R_{32}$ be alternatives of pixels which are able to be used for the noise reduction against the attention pixel Rc. The symmetry processing section 15 determines whether the individual adjacent pixels are point-symmetrical with respect to the attention pixel Rc.

For example, since the adjacent pixel $R_{21}$ and the adjacent pixel $R_{23}$ are point-symmetrical with respect to the attention pixel Rc, it is determined that the adjacent pixel $R_{21}$ and the adjacent pixel $R_{23}$ be adjacent pixels which are able to be used for the noise reduction. Likewise, since the adjacent pixel $R_{13}$ and the adjacent pixel $R_{31}$ are point-symmetrical with respect to the attention pixel Rc, it is determined that the adjacent pixel $R_{13}$ and the adjacent pixel $R_{32}$ be able to be used for the noise reduction. In addition, since the adjacent pixel $R_{12}$ and the adjacent pixel $R_{32}$ are point-symmetrical with respect to the attention pixel Rc, it is determined that the adjacent pixel $R_{12}$ and the adjacent pixel $R_{32}$ be adjacent pixels which are able to be used for the noise reduction. However, since it has been determined that the adjacent pixel $R_{33}$ which is point-symmetrical to the adjacent pixel $R_{11}$ with respect to the attention pixel Rc be an adjacent pixel which is not able to be used for the noise reduction, it is determined that the adjacent pixel $R_{11}$ is an adjacent pixel which is not able to be used for the noise reduction.

When adjacent pixels which are point-symmetrical with respect to an attention pixel are used for the noise reduction, the center of gravity of the attention pixel can be prevented from deviating due to the noise reduction. The deviation of the center of gravity of an attention pixel means that the position (spatial phase) of the attention pixel before the noise reduction is performed deviates from the position (spatial phase) of the attention pixel after the noise reduction is performed. For example, when the arithmetic mean process is performed for all alternatives of adjacent pixels which are able to be used for the noise reduction, if a symmetry determining process as shown in FIG. 12 has not been performed for the alternatives, the position of the attention pixel Rc after the arithmetic mean process is performed may deviate from the position of the attention pixel Rc before the arithmetic mean process is performed. When the center of gravity of a pixel deviates, after the noise reduction is performed, the linearity of the image is lost. After the noise reduction is performed, for example a straight line may become not straight. When the symmetry determination process is performed, the center of gravity of the attention pixel Rc can be prevented from deviating and the linearly of the image from deteriorating.

After the symmetry process of the symmetry processing section 15 is completed, adjacent pixels which are able to be used for the noise reduction are determined. Thereafter, an arithmetic mean process is performed by the arithmetic mean processing section 16. In parallel with the arithmetic mean process, a filter process is performed by the median filter 17.

The arithmetic mean processing section 16 performs the arithmetic mean process for the pixel level of the attention pixel and the pixel levels of adjacent pixels determined to be able to be used for the noise reduction. For example, in the example shown in FIG. 12, it is determined that the adjacent pixel $R_{12}$, the adjacent pixel $R_{13}$, the adjacent pixel $R_{21}$, the adjacent pixel $R_{23}$; the adjacent pixel $R_{31}$, and the adjacent pixel $R_{32}$ be able to be used for the noise reduction against the attention pixel Rc. Thus, the arithmetic mean processing section 16 adds the pixel level of the attention pixel Rc and the pixel levels of the adjacent pixel $R_{12}$, the adjacent pixel $R_{13}$, the adjacent pixel $R_{21}$, the adjacent pixel $R_{23}$, the adjacent pixel $R_{31}$, and the adjacent pixel $R_{32}$ and divides the sum by the number of pixels, namely 7. As a result, the arithmetic mean value is obtained. The obtained arithmetic mean value is supplied to the multiplying device 18.

The arithmetic mean process of the arithmetic mean processing section 16 allows noise of in particular an image signal to be reduced.

The median filter 17 performs a filter process in parallel with the process of the arithmetic mean processing section 16. The median filter 17 selects a nearly median value of the pixel level of the attention pixel and the pixel levels of the adjacent pixels which are able to be used for the noise reduction. The selected median value is supplied to the multiplying device 19. According to this embodiment, since the symmetry processing section 15 performs the symmetry determining process, the number of pixels used for the noise reduction is the total of an attention pixel and an even number of adjacent pixels which are point-symmetrical with respect to the attention pixel. Thus, the total number of pixels is an odd number. As a result, the median filter 17 selects the median value.

The median filter process of the median filter 17 allows frequency characteristics to be kept and noise to be reduced. However, since frequency characteristics are kept, namely an edge is prevented from becoming dull, the effect of the noise reduction of the median filter process is inferior to that of the arithmetic mean process.

The multiplying device 18 multiplies the arithmetic mean value supplied from the arithmetic mean processing section 16 by an coefficient α (where 0≦α≦1). On the other hand, the multiplying device 19 multiplies the median value by a coefficient (1-α).

Next, the coefficient α will be described. The coefficient α is determined depending on for example the number of pixels used for the noise reduction determined by the symmetry processing section 15. When the number of adjacent pixels determined to be able to be used for the noise reduction is large against an attention pixel in a detection region, it can be said that the detection region is present in a flat portion of an image. In contrast, when the number of adjacent pixels determined to be able to be used for the noise reduction is small, it can be said that the detection region includes an edge of an image. Thus, when the number of adjacent pixels is small, since the detection region is in a flat portion of an image, the value of the coefficient α is increased so as to enhance the effect of the noise reduction. In contrast, when the number of adjacent pixels is large, since the detection region contains an edge of an image, the value of the coefficient α is decreased and the value of the coefficient (1-α) is increased so as to mainly use the median filter which allows an edge to be kept and noise to be reduced.

Figure 13:
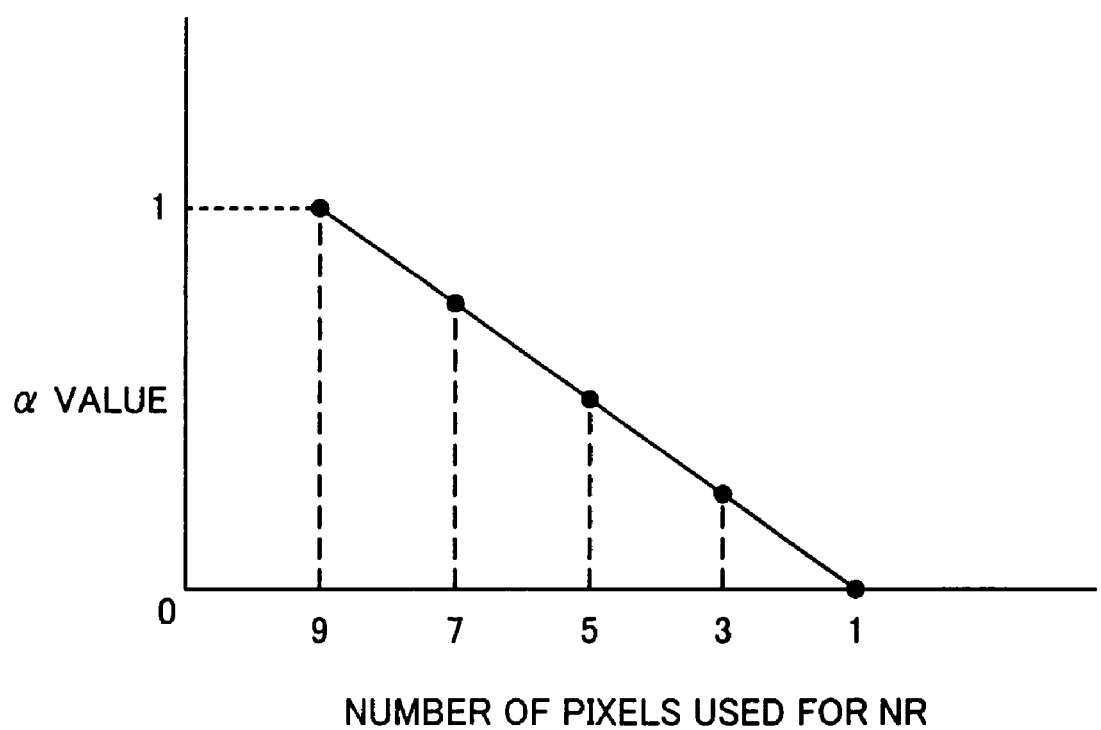
FIG. 13 is a schematic diagram showing an example of a coefficient α designating method according to an embodiment of the present invention.

FIG. 13 shows an example of a method of designating the coefficient α. When it has been determined that all adjacent pixels (eight pixels) in the detection region be able to be used for the noise reduction in the detection region according to this embodiment, the number of pixels which are able to be used for the noise reduction becomes nine. Since all the adjacent pixels are able to be used for the noise reduction, the coefficient α is designated as 1 so as to reduce noise. At this point, the value of the coefficient (1-α) becomes 0. In other words, only the arithmetic mean value is used. Thus, the median value is not used. As the number of pixels which are able to be used for the noise reduction is decreased to seven, five, and so forth, the possibility of which the detection region contains an edge becomes large. Thus, the median filter 17 is mainly used to prevent an edge of an image from becoming dull. In other words, as the number of pixels used for the noise reduction decreases, the value of the coefficient α is approached to 0 so as to increase the value of the coefficient (1-α).

It is not necessary to linearly vary the value of the coefficient α as shown in FIG. 13. For example, the weighted coefficient generating section 20 may store a table which correlates the number of pixels used for the noise reduction and the optimum value of the coefficient α.

The coefficient α may be adaptively designated as the luminance of the object varies. For example, when an image of an object is captured with a low luminance close to the minimum scene illumination of the imaging apparatus, granular noise often takes place. Thus, when the luminance is low, the value of the coefficient α is increased so as to decrease noise. Whenever the luminance is increased from the minimum scene illumination, the value of the coefficient α is decreased and thereby the ratio of the median value is increased so as to prevent the edge from becoming dull and reduce noise.

As information about illumination, for example luminance information which is detected when an automatic exposure function of the imaging apparatus is executed is used. When the automatic exposure function (also referred to as AE) is executed, luminance information is detected from an image signal and the detected luminance information is supplied to a control section such as a micro processor. The control section drives a driver corresponding to the luminance information to control the open and close states of a diaphragm of the lens and adjust the amount of incident light to the image sensor. The luminance information detected when the automatic exposure function is executed may be supplied to the weighted coefficient generating section 20 so that the value of the coefficient α is properly determined corresponding to the luminance level of the luminance information.

The determined coefficient α is supplied to the multiplying device 18. The coefficient (1-α) is supplied to the multiplying device 19. The multiplying device 18 outputs a value of which the arithmetic mean value is multiplied by the coefficient α. The multiplying device 19 outputs a value of which the median value is multiplied by the coefficient (1-α).

The adding device 22 adds output values of the multiplying device 18 and the multiplying device 19. The value obtained by the adding process is substituted with the pixel level of the attention pixel and then output from the noise reduction processing block 4.

In such a manner, the arithmetic mean process and the median filter process are performed in parallel and the output values of these processes are weighted with the weighted coefficient α which is varied and the weighted output values are added. As a result, the noise reduction process can be actively performed for a flat portion and a ramp portion of an image. In contrast, the noise reduction process can be performed for a portion containing an edge of an image (high frequency portion) so that the edge does not become dull and the frequency characteristics do not deteriorate. Thus, an optimum output image of which an edge does not become dull and noise is reduced can be obtained.

Figure 14:
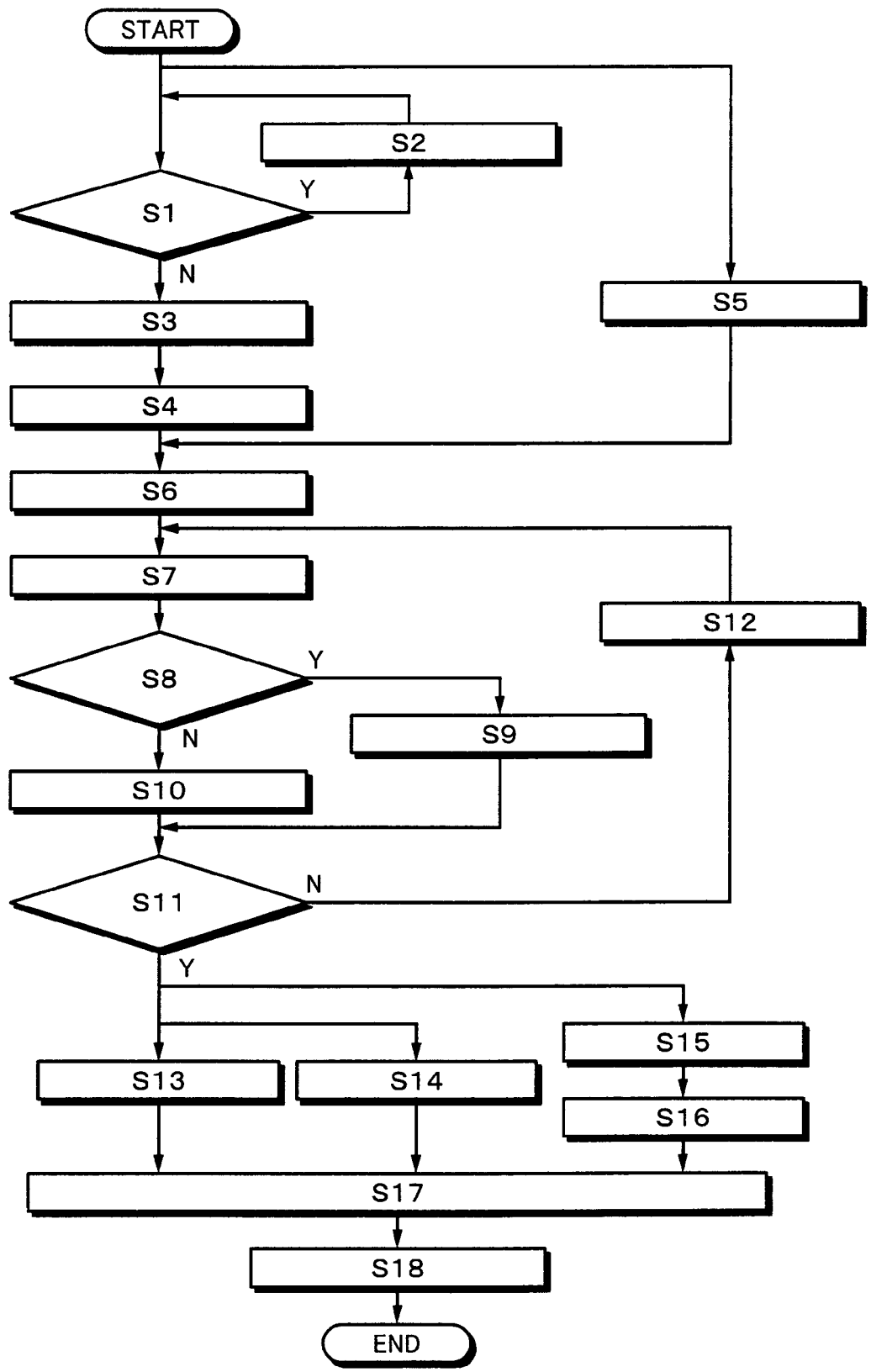
FIG. 14 is a flow chart showing a noise reduction process according to an embodiment of the present invention.

FIG. 14 is a flow chart showing a noise reduction process according to an embodiment of the present invention. This process may be accomplished by hardware or software which uses a program.

When the noise reduction process is started, the flow advances to step S1. At step S1, it is determined whether there is a defect pixel adjacent to an attention pixel in the vertical direction, the horizontal direction, the left diagonal direction, and right diagonal direction. In this example, a pixel to be determined to be a defect pixel is a pixel of the same color component as the attention pixel or a pixel of any color component and having a pixel level which is different from that of the attention pixel in a predetermined range.

When the determined result at step S1 denotes that there is a defect pixel, the flow advances to step S2. At step S2, the LPF 11 performs an interpolating process for a defect pixel in the direction perpendicular to the direction of the second-order differentiation. After the interpolating process is completed, the flow returns to step S1. When the interpolating process is performed, if there is a defect pixel adjacent to pixels in the vertical direction, the horizontal direction, the left diagonal direction, and the right diagonal direction, since there is an adjacent pixel with which the defect pixel is interpolated, the interpolating process is not able to be performed in the direction perpendicular to the direction of which the attention pixel and the defect pixel are connected. In this case, the interpolating process is not performed. After step S1, the position of the defect pixel is excluded from the process.

When the determined result at step S1 denotes that there is no defect pixel, the flow advances to step S3. At step S3, the LPF 11 performs a smoothening process in the directions perpendicular to the directions of the second-order differentiation. The pixel interpolated at step S2 has been smoothened by the interpolating process. Thus, it is not necessary to perform the smoothening process once again.

After the smoothening process is completed at step S3, the flow advances to step S4. At step S4, the second-order differentiation processing section 12 performs a second-order differentiation for the attention pixel and adjacent pixels in the vertical direction, the horizontal direction, the left diagonal direction, and the right diagonal direction. The second-order differentiation process is performed for e.g. an attention pixel and three adjacent pixels which are point-symmetrical with respect to the attention pixel in a detection region. When there are two or more pixels between pixels at the ends of the result of the second-order differentiation and the attention pixel, the second-order differentiation is performed in combinations of the attention pixel and all pixels at the ends.

In parallel with step S1 to step S4, the threshold value calculating section 14 calculates a threshold value at step S5. For example, the threshold value is calculated by extracting the square root of the pixel level of the attention pixel, multiplying the extracted square root by variable a, and adding the product and variable b where the values of variables a and b are any real numbers. This relationship is expressed by formula (1).

$$a*(\text{pixel level of attention pixel})^{\wedge}0.5+b \qquad (1)$$

Thereafter, the flow advance to step S6. At step S6, the pixel determining section 13 compares the second-order differentiated value which is the absolute value of the result of the second-order differentiation with the threshold value calculated at step S5. Thereafter, the flow advances to step S7.

At step S7, a determination pixel with which it is determined whether adjacent pixels are able to be used for the noise reduction in the detection region is detected. Thereafter, the flow advances to step S8.

At step S8, it is determined whether the second-order differentiated value of the attention pixel and the determination pixel is larger than the threshold value. When the second-order differentiated value is larger than the threshold value, the flow advances to step S9. At step S9, it is determined that the determination pixel be not able to be used for the noise reduction. In addition, the symmetry process is performed and it is determined that an adjacent pixel which is point-symmetrical to the determination pixel with respect to the attention pixel be not able to be used for the noise reduction.

In contrast, when the determined result at step S8 denotes that the second-order differentiated value is equal to or smaller than the threshold value, the flow advances to step S10. At step S10, it is determined that the determination pixel be an alternative of a pixel which is able to be used for the noise reduction. In addition, the symmetry processing section 15 performs the symmetry determination process. In the symmetry determination process, it is determined whether an adjacent pixel which is point-symmetrical to the determination pixel as an alternative of a pixel which is able to be used for the noise reduction with respect to the attention pixel is a pixel which is able to be used for the noise reduction. When the adjacent pixel which is point-symmetrical to the determination pixel with respect to the attention pixel is a pixel which is able to be used for the noise reduction, it is determined that the determination pixel be a pixel which is able to be used for the noise reduction. In contrast, when the adjacent pixel which is point-symmetrical to the determination pixel with respect to the attention pixel, it is determined that the determination pixel be a pixel which is not able to be used for the noise reduction.

Thereafter, the flow advances to step S11. At step S11, it is determined whether all the determination pixels in the detection region have been detected. When the determined result at step S11 denotes that all the determination pixels in the detection region have not been detected, the flow advances to step S12. At step S12, a determination pixel which has not been detected is detected. Step S7 to step S11 are performed for the detected determination pixel. In these steps, it is determined whether the determination pixel is a pixel which is able to be used for the noise reduction.

After all the adjacent pixels in the detection region have been detected at step S11, the flow advances to step S13. At step S13, the arithmetic mean processing section 16 calculates an arithmetic mean of the pixel level of the attention pixel and the pixel levels of the adjacent pixels determined to be able to be used for the noise reduction and obtains the arithmetic mean value.

In parallel with the arithmetic mean process at step S13, the median filter 17 performs a median filter process at step S14. In the median filter process, a median value of the pixel level of the attention pixel and the pixel levels of the adjacent pixels determined to be able to be used for the noise reduction is selected.

In parallel with the arithmetic mean process at step S13 and the median filter process at step S14, a coefficient α determination process (where $0 \leq \alpha \leq 1$) is performed. At step S15, the total number of adjacent pixels determined to be able to be used for the noise reduction at step S11 and the attention pixel is held as the number of pixels which are used for the noise reduction.

Thereafter, the flow advances to step S16. At step S16, the coefficient α determination process is performed. The coefficient α is adaptively determined by referencing a table stored in the weighted coefficient generating section 20 corresponding to the number of pixels used for the noise reduction. Instead, the coefficient α may be adaptively determined corresponding to the illumination of an object to be shot rather than the number of pixels used for the noise reduction.

Thereafter, the flow advances to step S17. At step S17, a weighted addition process is performed in the following manner. The arithmetic mean value calculated at step S13 is multiplied by the coefficient α determined at step S16. Thereafter, the median value selected at step S14 is multiplied by the coefficient (1-α). Thereafter, their products are added.

Thereafter, the flow advances to step S18. At step S18, the pixel level of the attention pixel is substituted with the value obtained by the weighted addition process executed at step S17. Thereafter, the noise reduction process is completed.

In the foregoing, embodiments of the present invention were specifically described. However, these embodiments of the present invention are just examples. In other words, various modifications may be made according to the spirit and scope of the present invention. For instance, the foregoing embodiments were described with pixels of the R component. Of course, the embodiments of the present invention may be applied to pixels of the B component and pixels of the G component which are arranged in the color filter. In addition, in a color filter of a complement color system using cyan (C), magenta (M), and yellow (Y) and a color filter using four or more colors, the noise reduction according to embodiments of the present invention can be performed by extracting pixels of the same color component. In addition, embodiments of the present invention can be applied to not only the arrangement of the color filter shown in FIG. 3, but also the arrangement of a color filter according to for example Bayer array.

Figure 15:
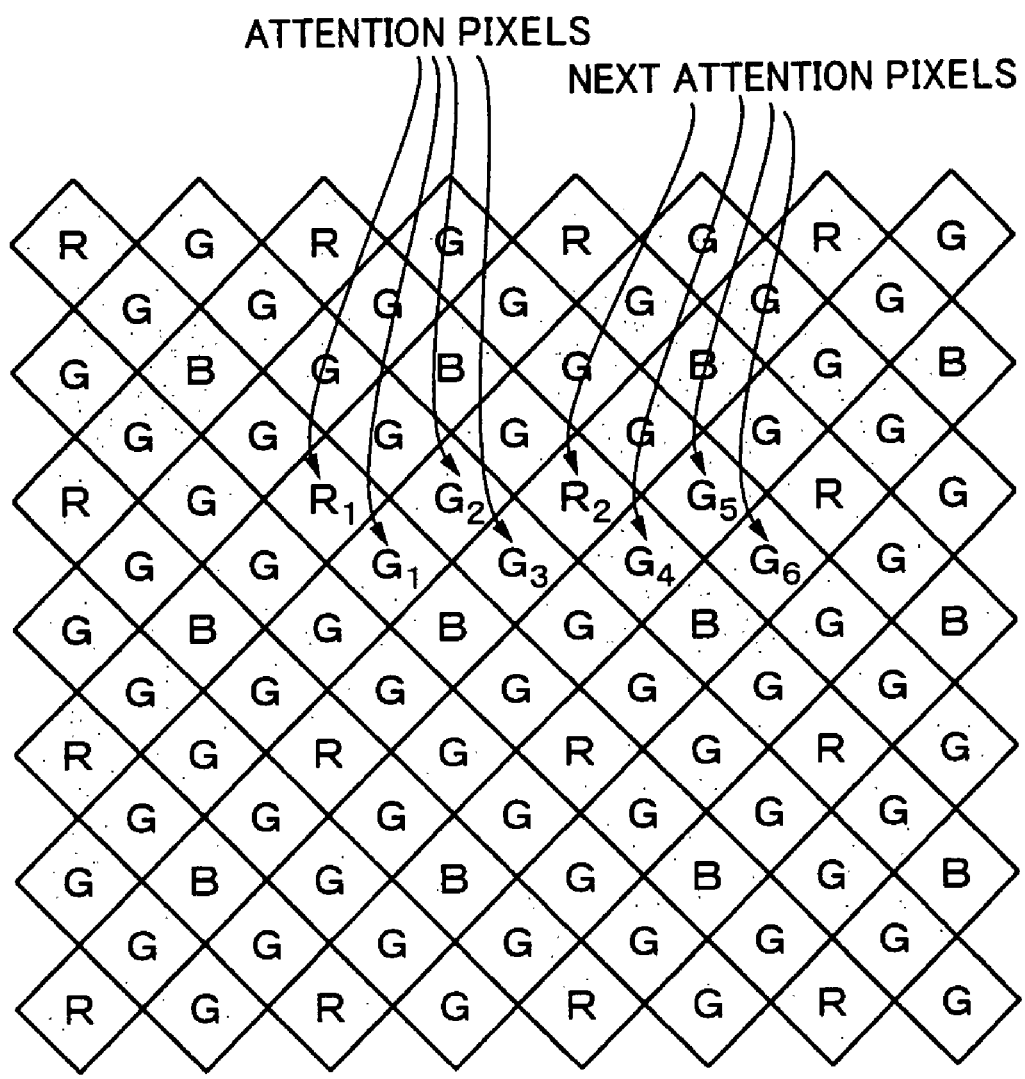
FIG. 15 is a schematic diagram describing positions of attention pixels when the noise reduction process is performed in parallel.

In addition, a plurality of noise reduction blocks 4 may be disposed so that they are operated in parallel. For example, as shown in FIG. 15, pixels $R_1$, $G_1$, $G_2$, and $G_3$ may be designated as attention pixels. Detection regions may be designated for these attention pixels. The noise reduction process may be performed for these attention pixels in parallel. Thereafter, pixels $R_2$, $G_4$, $G_5$, and $G_6$ may be designated as attention pixels in the pixel reading direction. In this manner, the noise reduction may be performed.

Next, a modification of an embodiment of the present invention will be described. In the modification of the embodiment of the present invention, when an attention pixel has a unique value against adjacent pixels, the noise reduction process according to the foregoing embodiment is properly performed.

Next, with reference to FIG. 16A to FIG. 16C and FIG. 17A and FIG. 17B, a modification of an embodiment of the present invention will be described in brief. In FIG. 16A to FIG. 16C and FIG. 17A and FIG. 17B, horizontal axis represents positions of pixels, whereas vertical axis represents levels of pixels. In a real captured image, as exemplified in FIG. 16A, the pixel level of an attention pixel 401 may have a unique value, for example an extremely large value, against the pixel levels of adjacent pixels 402, 402, . . . . In this case, it is thought that the attention pixel 401 is not correlated with the adjacent pixels 402, 402, . . . and that the attention pixel 401 is an isolated point against adjacent pixels.

Next, the case of which the noise reduction process according to the foregoing embodiment is performed for the attention pixel 401 as an isolated point will be considered. First, a smoothening process is performed by a LPF 11. In the smoothening process, as was described above, the pixel levels of pixels in a predetermined range are added and the sum is divided by the number of additions. In the smoothening process, when the number of additions is several, it is thought that the smoothening effect for the attention pixel 401 is not highly expectable. In other words, after the smoothening process is performed by the LPF 11, the value of the attention pixel 401 is much larger than the values of the adjacent pixels 402, 402, . . . . Thus, the state of which the attention pixel 401 is an isolated point against the adjacent pixels 402, 402, . . . is kept.

Thereafter, a second-order differentiation processing section 12 performs a second-order differentiation process. Since the value of the attention pixel 401 is much larger than the values of the adjacent pixels 402, 402, . . . , the result of the second-order differentiation process becomes very large. When a value based on the square root of the level of the attention pixel is used as threshold value $\epsilon$ against the result of the second-order differentiation process as exemplified with formula (1) of the foregoing embodiment, there is a possibility of which the result of the second-order differentiation process shows that all the adjacent pixels 402, 402, . . . are not used for the noise reduction process depending on the value of real number b. In this case, only the attention pixel 401 is a pixel used for the noise reduction process.

When only the attention pixel 401 is a pixel that can be used for the noise reduction process, coefficient $\alpha$ that represents a mixing ratio of the result of the arithmetic mean process and the result of the median filter process becomes for example 0 (refer to FIG. 13). As a result, only the result of the median filter process is output. As described above, the result of the second-order differentiation process shows that only the attention pixel 401 is a pixel that can be used for the noise reduction process. Thus, as exemplified with a pixel 403 in FIG. 16B, the value of the attention pixel 401 is simply output. In this case, as a result, the noise reduction process is not performed for the attention pixel 401.

Figure 16A:
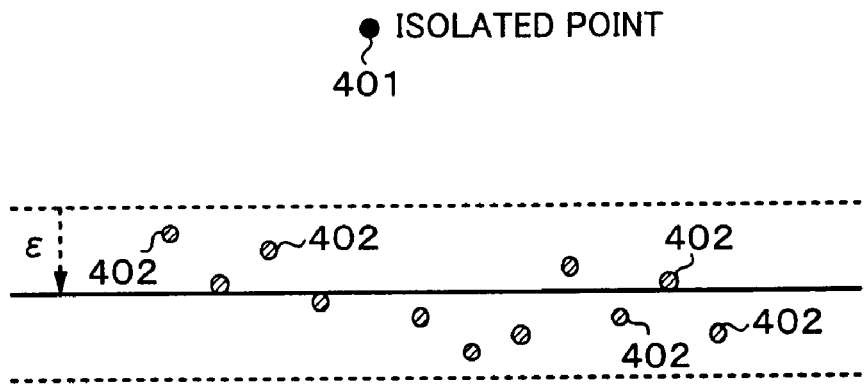
FIG. 16A to FIG. 16C are schematic diagrams describing a modification of an embodiment of the present invention.
Figure 16B:
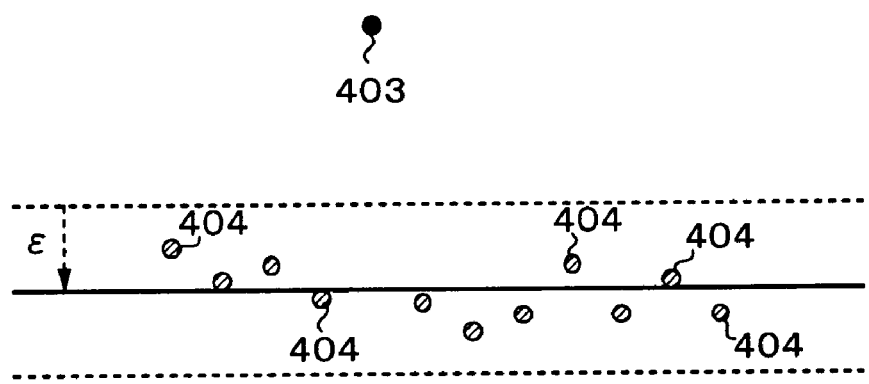

In the method of the foregoing embodiment, when the threshold value $\epsilon$ against the result of the second-order differentiation process is decided on the basis of the pixel level of an attention pixel and the noise reduction process is performed for each of adjacent pixels 402 as an attention pixel, as exemplified with pixels 404, 404, . . . in FIG. 16B, while high frequency components of the image are kept, an effect of noise reduction can be obtained.

Figure 16C:
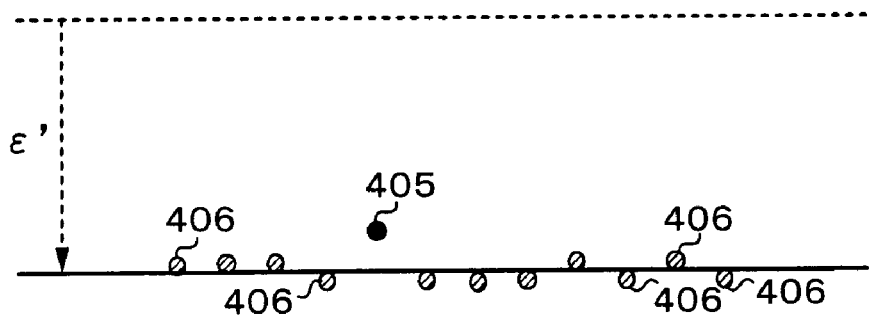

On the other hand, when the noise reduction process is performed in the method of the foregoing embodiment, a threshold value against the result of the second-order differentiation may be a large value including the pixel level of for example the attention pixel 401 as exemplified with threshold value $\epsilon$ in FIG. 16C to prevent the attention pixel 401 as an isolated point from being simply output. In this case, the detection ratio of pixels that can be used in the noise reduction process becomes high. Thus, coefficient $\alpha$ becomes 1 or close to 1. The value of the attention pixel 401 is smoothened as exemplified with a pixel 405 in FIG. 16C and thereby an effect of noise reduction can be obtained.

However, in this method, when the process is performed for each of the pixels 402, 402, . . . as an attention pixel, the ratio of outputs based on the arithmetic mean calculating process becomes very large. As exemplified with pixels 406, 406, . . . in FIG. 16C, there is a possibility of which a high frequency portion of the image is lost. In this case, the edge portion of the image becomes dull, resulting in deteriorating the quality of the image.

In the modification of the embodiment of the present invention, the noise reduction process of the embodiment can be properly performed for such an isolated point.

The noise reduction method of the modification of the embodiment of the present invention will be described in brief. In the nose reduction method, it is determined whether an attention pixel is an isolated point. When the determined result denotes that the attention pixel is an isolated point, the median filter process is performed on the basis of the pixel levels of all pixels in a predetermined range including the attention pixel. The obtained value is substituted for the value of the pixel level of the attention pixel and the substituted value is output. In contrast, when the determined result denotes that the attention pixel is not an isolated point, in the method of the foregoing embodiment, with a mixing ratio based on the number of pixels that can be used for the noise reduction process, the result of the arithmetic mean calculating process and the result of the median filter process are mixed. The obtained value is substituted for the value of the pixel level of the attention pixel and the substituted value is output.

Figure 17A:
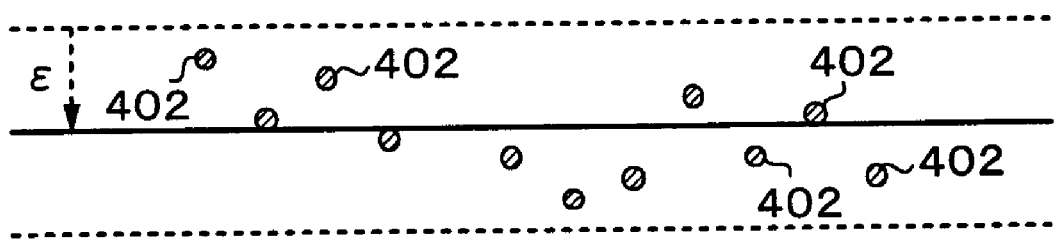
FIG. 17A and FIG. 17B are schematic diagrams describing a modification of an embodiment of the present invention.
Figure 17B:
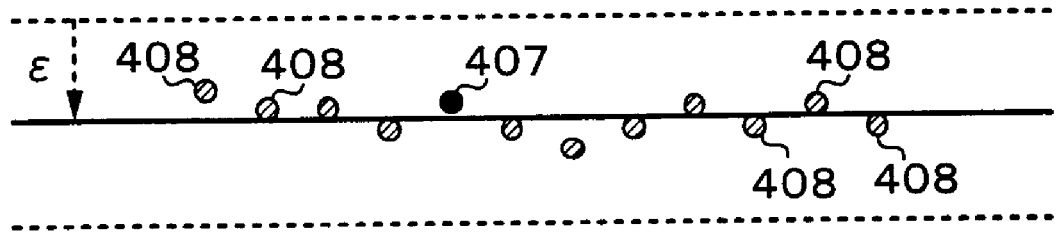

Next, with reference to FIG. 17A and FIG. 17B, the modification of the embodiment of the present invention will be described more specifically. In FIG. 17A, similar portions to those in FIG. 16A will be denoted by similar reference numerals. It is determined whether an attention pixel 401 exemplified in FIG. 17A is an isolated point that has a unique value against the levels of adjacent pixels. When the determined result denotes that only the attention pixel 401 of pixels in a predetermined range including the attention pixel 401 is a pixel that can be used for the noise reduction process, it is determined that the attention pixel 401 be an isolated point. When the attention pixel 401 is an isolated point, the median filter process is performed on the basis of the levels of the pixels in the predetermined range containing the attention pixel 401. The result of the median filter process is substituted for the level of the attention pixel 401 and the substituted value is output. This output value is exemplified with a pixel 407 in FIG. 17B.

On the other hand, the noise reduction process is performed for each of the pixels 402, 402, . . . determined to be not an isolated point with threshold value $\epsilon$ based on the level of the attention pixel for the result of the second-order differentiation process in the method of the foregoing embodiment.

Thus, as exemplified with pixels 408, 408, ..., an effect of noise reduction is obtained while high frequency components of the image are kept.

Last, the noise reduction process is properly performed for the attention pixel 401 determined to be an isolated point and the pixels 402 determined to be not an isolated point. As a result, a high quality image of which high frequency components are kept and the level of an isolated point is suppressed can be obtained.

Thus, by determining whether an attention pixel is an isolated point and changing processes based on the determined result, the noise reduction process can be properly performed.

Figure 18B:
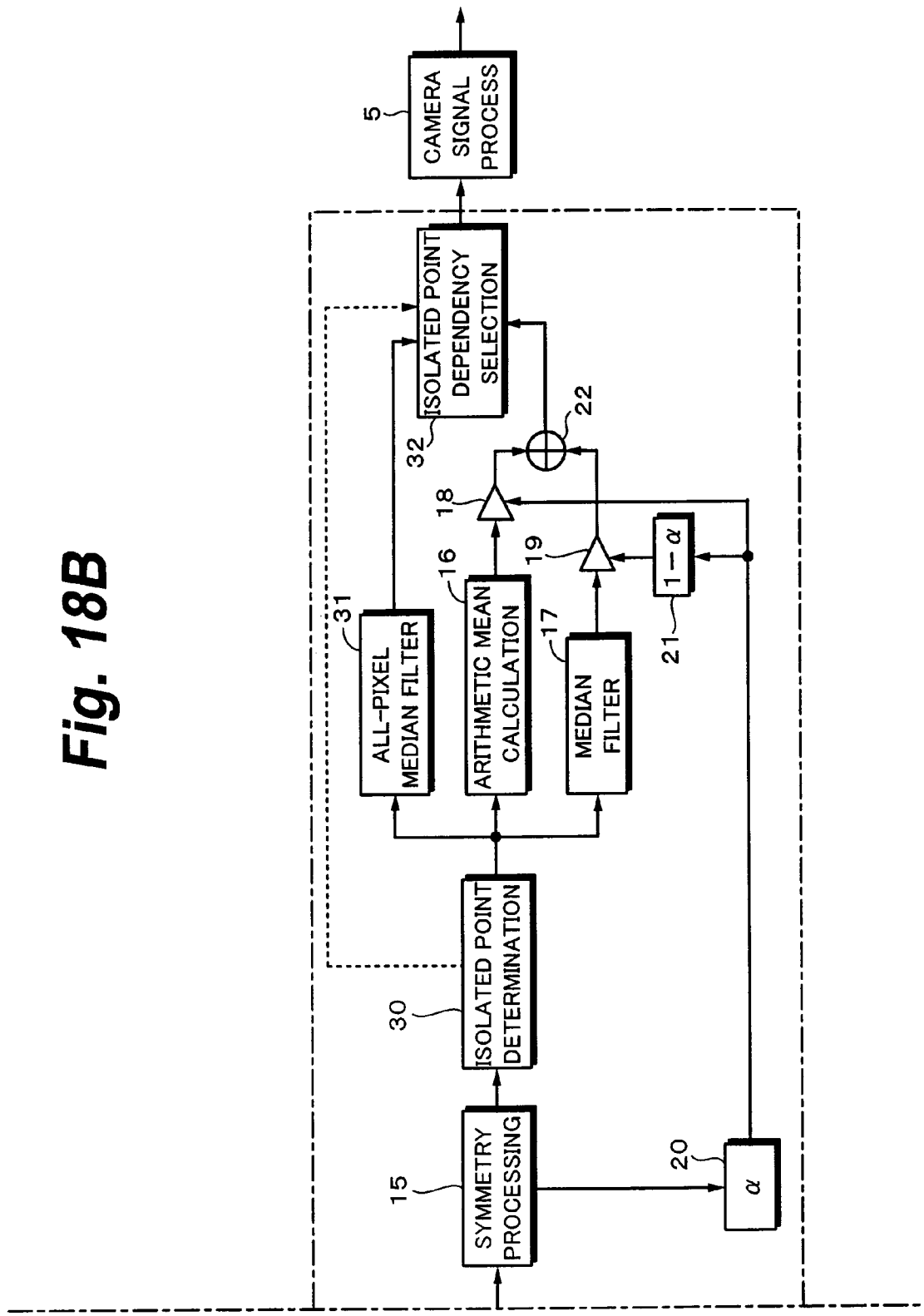

FIG. 18A and FIG. 18B show an example of the structure of an imaging apparatus 1' according to the modification of the embodiment of the present invention. In the structure shown in FIG. 18A and FIG. 18B, similar portions to those of the structure shown in FIG. 2 will be denoted by similar reference numerals and their detailed description will be omitted. In the following description, it is assumed that the color of an attention pixel is the same as the color of each of adjacent pixels.

The imaging apparatus 1' is different from the imaging apparatus 1 according to the foregoing embodiment except that the former also has an isolated point determination section 30, an all-pixel median filter section 31, and an isolated point dependency selection section 32 that are added to the imaging apparatus 1. The isolated point determination section 30 determines whether an attention pixel is an isolated point. The all-pixel median filter section 31 performs a median filter process for pixels in a predetermined range including an attention pixel. The isolated point dependency selection section 32 is controlled for example on the basis of the result of the determination of the isolated point determination section 30. The isolated point dependency selection section 32 selects an output of an adding device 22 or an output of the all-pixel median filter section 31, substitutes the selected output for the level of the attention pixel, and outputs the substituted value.

Next, the noise reduction process based on the structure shown in FIG. 18A and FIG. 18B will be described more specifically. An image signal that is output from an image sensor 2 is input to a noise reduction block 4' through a delay line 3. Thereafter, the image signal is supplied to a LPF 11 and a threshold value calculating section 14. The threshold value calculating section 14 calculates threshold value $\epsilon$ based on the level of the attention pixel for example according to the foregoing formula (1). The threshold value $\epsilon$ is supplied to a pixel determining section 13.

In addition, the image signal is supplied to the LPF 11. The LPF 11 performs a smoothening process for the image signal. A second-order differentiation processing section 12 performs a second-order differentiation process with the attention pixel and adjacent pixels thereof. The results of the second-order differentiation for the adjacent pixels are supplied to a pixel determining section 13. The pixel determining section 13 compares the results with the threshold value $\epsilon$ calculated by the threshold value calculating section 14. As the result of the comparison, an adjacent pixel whose level is smaller than the threshold value $\epsilon$ is determined to be an alternative of a pixel that can be used for the noise reduction process. Thereafter, a symmetry processing section 15 determines whether a pixel determined to be an alternative of a pixel that can be used for the noise reduction process by the pixel determining section 13 is symmetrical with respect to the attention pixel. A pixel that is an alternative of a pixel that can be used for the noise reduction process and that is not symmetrical with respect to the attention pixel is not used for the noise reduction process. A weighted coefficient generating section 20 generates coefficient $\alpha$ on the basis of the number of pixels determined to be used for the noise reduction process by the symmetry processing section 15.

The isolated point determination section 30 determines whether the attention pixel is an isolated point. When for example the result obtained until the process of the symmetry processing section 15 has been performed denotes that only the attention pixel is a pixel that can be used for the noise reduction process, the isolated point determination section 30 determine that the attention pixel be an isolated point. When the result obtained until the process of the symmetry processing section 15 has been performed denotes that only one pixel can be used for the noise reduction process, the pixel is the attention pixel itself.

In contrast, when there are two or more pixels that can be used for the noise reduction process, the isolated point determination section 30 determines that the attention pixel be not isolated points. Specifically, the symmetry processing section 15 determines whether the adjacent pixels are symmetrically with respect to the attention pixel in the foregoing manner. Thus, when the number of pixels determined to be able to be used for the noise reduction process is 3, 5, 7, 9, ..., the isolated point determination section 30 determines that the attention pixel be not an isolated point.

The all-pixel median filter section 31 performs a median filter process for all pixels in a predetermined range, for example a detection region, around the attention pixel. In other words, the all-pixel median filter section 31 performs a median filter process for all pixels in the range including pixels determined to be not used in the noise reduction process as the result obtained until the process of the symmetry processing section 15 has been performed. An output of the all-pixel median filter section 31 is supplied to the isolated point dependency selection section 32.

An arithmetic mean processing section 16 and a median filter 17 perform the same processes as those of the foregoing embodiment. In other words, the arithmetic mean processing section 16 obtains an arithmetic mean with pixels determined to be able to be used for the noise reduction process as the result obtained until the process of the symmetry processing section 15 has been performed. The median filter 17 outputs the pixel level of a pixel that has the median value. An output of the arithmetic mean processing section 16 is supplied to a multiplying device 18. The multiplying device 18 multiplies the output of the arithmetic mean processing section 16 by coefficient $\alpha$. On the other hand, an output of the median filter 17 is supplied to a multiplying device 19. The multiplying device 19 multiplies the output of the median filter 17 by coefficient $(1-\alpha)$. Outputs of the multiplying device 18 and the multiplying device 19 are supplied to the adding device 22. The adding device 22 adds the outputs of the multiplying device 18 and the multiplying device 19. An output of the adding device 22 is supplied to the isolated point dependency selection section 32.

The isolated point dependency selection section 32 selects the output of the all-pixel median filter section 31 or the output of the adding device 22 on the basis of the result of the determination of the isolated point determination section 30, substitutes the selected output for the level of the attention pixel, and outputs the substituted value. In other words, when the isolated point determination section 30 has determined that the attention pixel be an isolated point, the all-pixel median filter section 31 selects the output of the all-pixel median filter section 31, substitutes the value outputted from the all-pixel median filter section 31 for the level of the attention pixel, and outputs the substituted value.

In contrast, when the isolated point determination section 30 has determined that the attention pixel be not an isolated point, the isolated point dependency selection section 32 selects the output of the adding device 22, substitutes the mixed value of which the output of the arithmetic mean processing section 16 and the output of the median filter 17 were weight-mixed on the basis of coefficient α for the level of the attention pixel, and outputs the substituted value.

Figure 19:
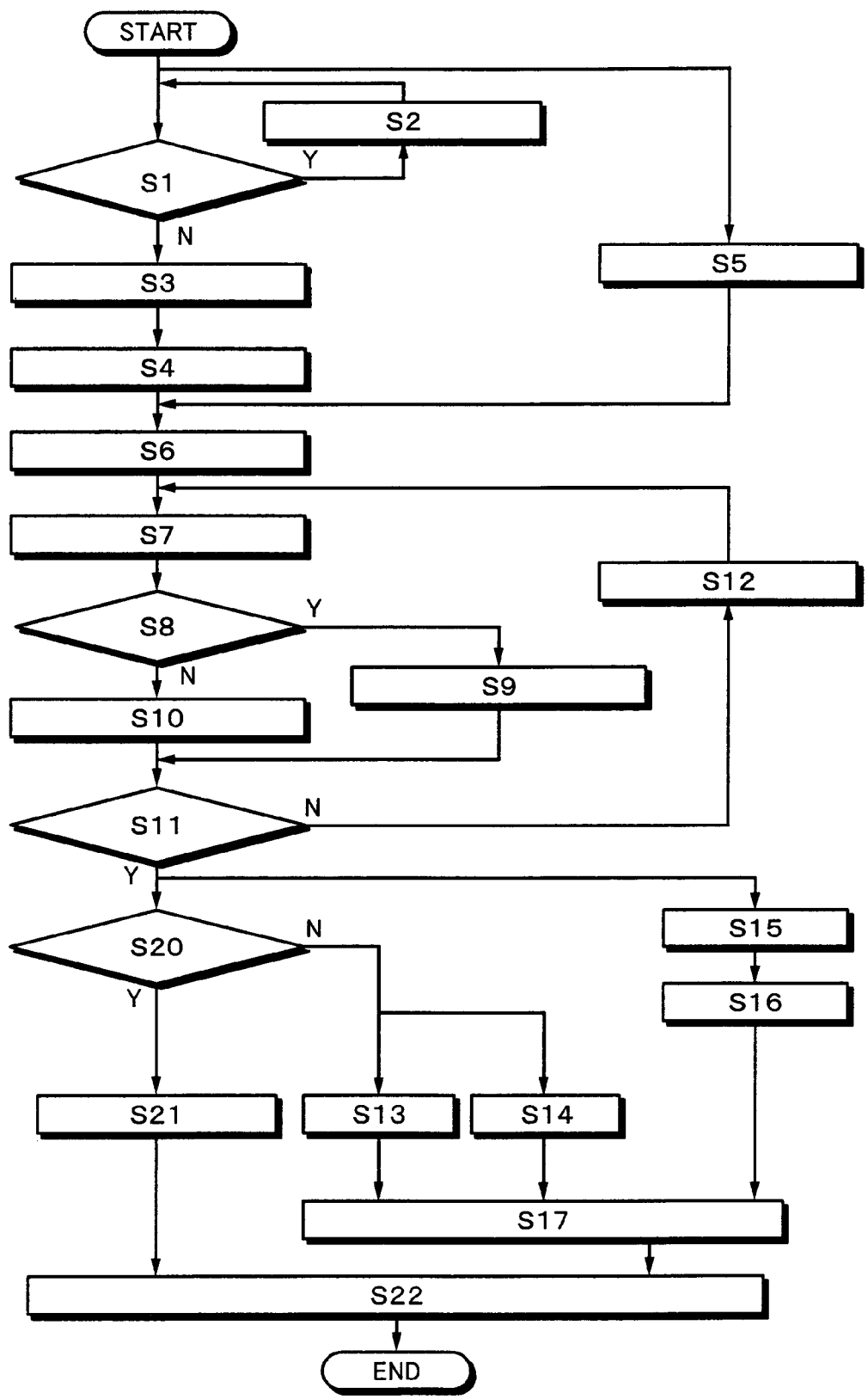
FIG. 19 is a flow chart showing a noise reduction process according to a modification of an embodiment of the present invention.

FIG. 19 is a flow chart showing an example of the noise reduction process according to the modification of the embodiment of the present invention. In FIG. 19, similar portions to those of FIG. 14 will be denoted by similar reference numerals and their description will be omitted.

In the flow chart shown in FIG. 19, a process up to step S12 is the same as the process up to step S11 of the foregoing embodiment. In other words, at step S1, it is determined whether there is a defect pixel in pixels of a predetermined range around an attention pixel. When the determined result denotes that there is a defect pixel, the flow advances to step S2. At step S2, the defect pixel is interpolated. In contrast, when the determined result denotes that there is no defect pixel, the flow advances to step S3. At step S3, the LPF 11 performs a smoothening process. Thereafter, the flow advances to step S4. At step S4, the second-order differentiation processing section 12 uses the attention pixel and the adjacent pixels and calculates second-order differentiation for each of the adjacent pixels. In parallels with these steps, at step S5, threshold value ε is calculated on the basis of the pixel level of the attention pixel. At step S6, each of the second-order differentiated values of the adjacent pixels (at step S12) is compared with the threshold value ε. At step S7, a determination pixel is considered. At step S8, it is determined whether the second-order differentiated value of the determination pixel is greater than the threshold value ε. When the second-order differentiated value of the determination pixel is greater than the threshold value ε, the determination pixel cannot be used for the noise reduction process (at step S9). Instead, when the second-order differentiated value of the determination pixel is smaller than the threshold value ε, the determination pixel can be used for the noise reduction process (at step S10).

At step S11, it is determined whether all pixels in the detection range have been considered. When the determined result denotes that all the pixels have not been considered, the flow returns to step S7. At step S7, the next pixel to be detected is considered. When the determined result denotes that all the pixels to be detected have been considered and that it has been determined whether they can be used for the noise reduction process, the flow advances to step S20. In parallel with steps that follow step S20, step S15 and step S16 are performed. In other words, at step S15, the number of pixels that can be used for the noise reduction process is kept. At step S16, the weighted coefficient generating section 20 decides coefficient α on the basis of the number of pixels that are kept.

On the other hand, at step S20, the isolated point determination section 30 determines whether a pixel that can be used for the noise reduction process is only the attention pixel itself. When the determined result denotes that there are pixels that can be used for the noise reduction process other than the attention pixel, the flow advances to step S13 and step S14. At step S13, an arithmetic mean calculating process is performed. At step S14, a median filter process is performed. At step S17, the multiplying device 18 and the multiplying device 19 perform multiplication processes on the basis of the results obtained at step S13 and step S14 and the coefficient α decided at step S16. The results of the multiplications are added by the adding device 22.

In contrast, when the determined result of the isolated point determination section 30 at step S20 denotes that a pixel that can be used for the noise reduction process is only the attention pixel itself, the flow advances to step S21. At step S21, the all-pixel median filter section 31 performs a median filter process for all the pixels to be detected in the detection range.

At step S23, the output of step S17 or the output of step S21 is selected and substituted for the pixel level of the attention pixel on the basis of the determined result obtained at step S20. In other words, at step S23, when the attention pixel has been determined to be an isolated point on the basis of the determined result of the isolated point determination section 30, the isolated point dependency selection section 32 selects the output of the all-pixel median filter section 31 and substitutes the value of the output for the level of the attention pixel.

In contrast, when the determined result of the isolated point determination section 30 denotes that the attention pixel is not an isolated point, the isolated point dependency selection section 32 selects the output of the adding device 22 and substitutes the value of the output of which the output of the arithmetic mean processing section 16 and the output of the median filter 17 were weight-mixed on the basis coefficient α for the pixel level of the attention pixel.

Figure 20:
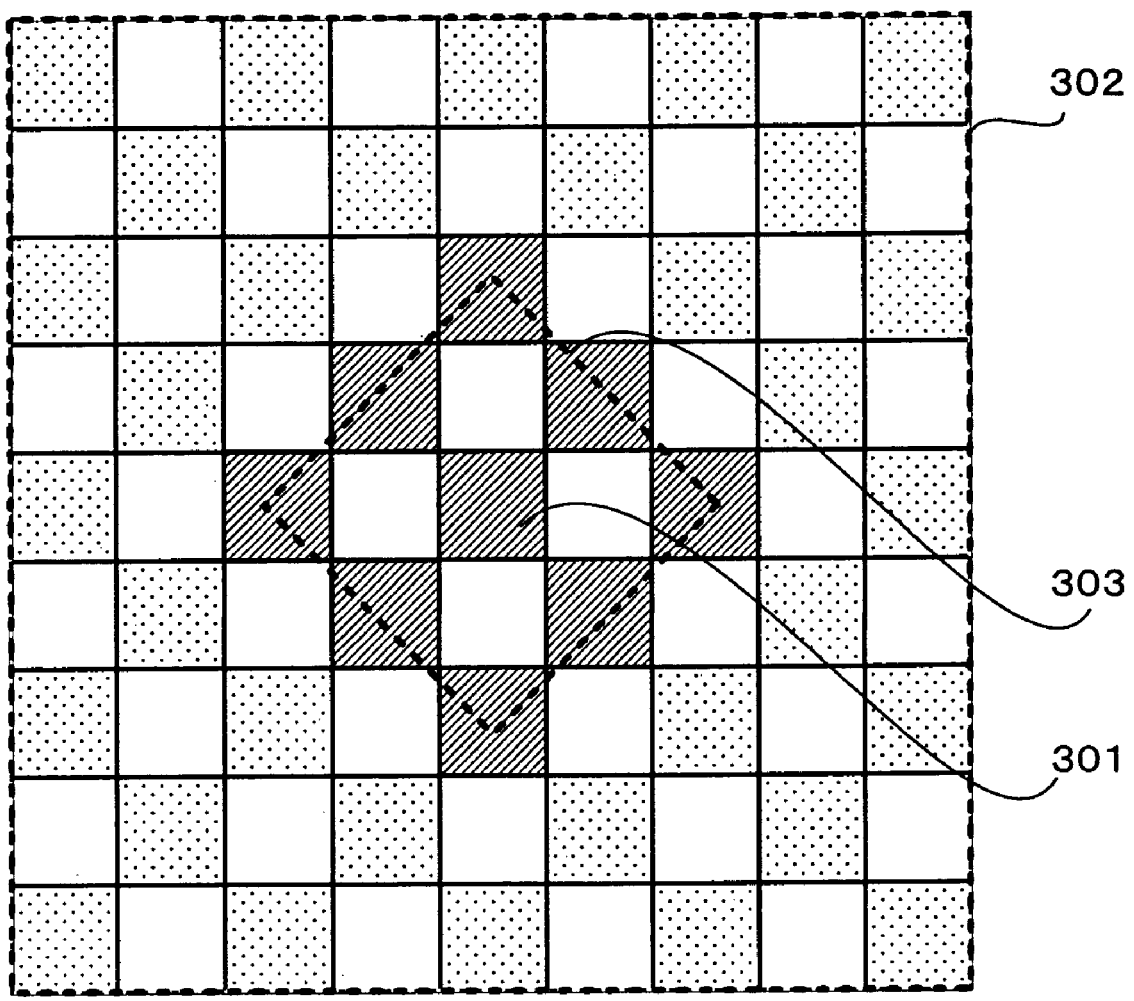
FIG. 20 is a schematic diagram showing an example of which a range of pixels for an arithmetic mean calculating process is different from that for a median filter process.

In the foregoing, it was described that the range of pixels used for the arithmetic mean calculating process was the same as that for the median filter process. However, the present invention is not limited to such an example. For instance, as exemplified in FIG. 20, a range 302 for the arithmetic mean calculating process may be different from a range 303 for the median filter process. Of cause, even if their ranges are differ from each other, it is necessary for an attention pixel 301 to be positioned at the centers of these ranges. In FIG. 20, squares that are hatched and squares that are shaded represent pixels.

The arithmetic mean calculating process is performed by successively adding input data without necessity of holding them. In contrast, the median filter process is performed by holding all input data and then extracting a median value from the held data. Thus, the median filter process needs to have a larger memory capacity than the arithmetic mean calculating process. In addition, the median filter process needs a longer process time than the arithmetic mean calculating process. Thus, it is thought that the range 303 of pixels for the median filter process and the range 302 of pixels for the arithmetic mean calculating process are set so that the range 303 is smaller than the range 302.

In the foregoing, it was described that the process of the all-pixel median filter section 31 and the process of the arithmetic mean processing section 16 and the median filter 17 were performed in parallel. However, the present invention is not limited to such an example. For instance, a process that is not used in these processes may be stopped on the basis of the determined result of the isolated point determination section 30. For example, when the isolated point determination section 30 has determined that the attention pixel is an isolated point, it may be thought that the processes of the arithmetic mean processing section 16, the median filter 17, the multiplying devices 18 and 19, the adding device 22, and so forth are stopped.

Embodiments of the present invention may be applied to a mobile telephone and a Personal Digital Assistant (PDA) having an image capturing function besides imaging apparatuses such as a digital camera and a digital still camera. The foregoing processing function is accomplished by a personal computer which uses a program. The program which describes processes can be recorded on a record medium such as a magnetic recording device, an optical disc, a magneto-optical disc, a semiconductor memory, or the like from which a computer can read the program.

DESCRIPTION OF REFERENCE NUMERALS 1, 1' IMAGING APPARATUS
2 IMAGE SENSOR
4, 4' NOISE REDUCTION BLOCK
11 LPF
12 SECOND-ORDER DIFFERENTIATION PROCESSING SECTION
13 PIXEL DETERMINING SECTION
15 SYMMETRY PROCESSING SECTION
16 ARITHMETIC MEAN PROCESSING SECTION
17 MEDIAN FILTER
18, 19 MULTIPLYING DEVICE
20, 21 WEIGHTED COEFFICIENT GENERATING SECTION
22 ADDING DEVICE
30 ISOLATED POINT DETERMINATION SECTION
31 ALL-PIXEL MEDIAN FILTER SECTION
32 ISOLATED POINT DEPENDENCY SELECTION SECTION
S1 IS THERE DEFECT PIXEL ?
S2 PERFORM INTERPOLATING PROCESS.
S3 PERFORM LPF PROCESS.
S4 PERFORM SECOND-ORDER DIFFERENTIATION PROCESS.
S5 CALCULATE THRESHOLD VALUE.
S6 COMPARE RESULT OF SECOND-ORDER DIFFERENTIATION WITH THRESHOLD VALUE.
S7 CONSIDER DETERMINATION PIXEL IN DETECTION RANGE.
S8 IS RESULT OF SECOND-ORDER DIFFERENTIATION GREATER THAN THRESHOLD VALUE ?
S9 DETERMINATION PIXEL CANNOT BE USED.
S10 DETERMINATION PIXEL CAN BE USED.
S11 HAS ALL PIXELS TO BE DETECTED BEEN CONSIDERED ?
S12 IS THERE DETERMINATION PIXEL ?
S13 CALCULATE ARITHMETIC MEAN VALUE.
S14 CALCULATE MEDIAN VALUE.
S15 HOLD NUMBER OF PIXELS USED FOR NR.
S16 DECIDE α
S17 PERFORM MULTIPLICATION AND ADDITION PROCESS.
S18 SUBSTITUTE FOR PIXEL LEVEL.
S20 CAN ONLY DETERMINATION PIXEL BE USED ?
S21 CALCULATE MEDIAN VALUE OF ALL PIXELS.
S22 SUBSTITUTE FOR PIXEL LEVEL.

The invention claimed is:

1. An imaging apparatus having an imaging section and a noise reduction device which performs noise reduction for an image signal obtained from the imaging section, the noise reduction device comprising:
extracting means for extracting an attention pixel used for the noise reduction and a plurality of adjacent pixels of the same color component as the attention pixel;
edge detecting means for detecting whether there is an edge between the attention pixel and the plurality of adjacent pixels;
determining means for determining that the adjacent pixels be able to be used for the noise reduction when the edge detecting means has not detected an edge and determining that the adjacent pixels be not able to be used for the noise reduction when the edge detecting means has detected an edge;
first processing means for performing a first noise reduction process for a pixel value of the attention pixel and pixel values of the adjacent pixels determined to be able to be used for the noise reduction by the determining means;
second processing means for performing a second noise reduction process for the pixel value of the attention pixel and the pixel values of the adjacent pixels determined to be able to be used for the noise reduction by the determining means while frequency characteristics are kept; and
weighted adding means for adding an output value of the first processing means to which a first weighted coefficient is applied and an output value of the second processing means to which a second weighted coefficient determined using the first weighted coefficient is applied.

2. The imaging apparatus as set forth in claim 1,
wherein the edge detecting means performs a second-order differentiation for the pixel value of the attention pixel and the pixel values of the adjacent pixels to detect an edge.

3. The imaging apparatus as set forth in claim 2, further comprising:
smoothening means for smoothening the attention pixel and the plurality of adjacent pixels in a direction perpendicular to a direction in which the second-order differentiation is performed for these pixels; and
interpolating means for interpolating a defect pixel if there is the defect pixel in the direction of the second-order differentiation.

4. The imaging apparatus as set forth in claim 1,
wherein an adjacent pixel which is point-symmetrical with respect to the attention pixel in the adjacent pixels determined to be able to be used for the noise reduction by the determining means is determined to be able to be used for the noise reduction.

5. The imaging apparatus as set forth in claim 1,
wherein the edge detecting means is means for detecting an edge with the pixel value of the attention pixel and the pixel values of the adjacent pixels which are point-symmetrical with respect to the attention pixel.

6. The imaging apparatus as set forth in claim 1,
wherein the first processing means outputs a mean value of the pixel value of the attention pixel and the pixel values of the adjacent pixels determined to be able to be used for the noise reduction by the determining means, and
wherein the second processing means selects a pixel value of a nearly median value of the pixel value of the attention pixel and the pixel values of the adjacent pixels determined to be able to be used for the noise reduction by the determining means and outputs the selected pixel value.

7. The imaging apparatus as set forth in claim 1,
wherein the first processing means is arithmetic mean calculating means for calculating a mean value of the pixel value of the attention pixel and the pixel values of the adjacent pixels determined to be able to be used for the noise reduction by the determining means, and
wherein the second processing means is a median filter.

8. The imaging apparatus as set forth in claim 1, further comprising:
output means for substituting the pixel value of the attention pixel with a value obtained by the weighted adding means and outputting the obtained value.

9. The imaging apparatus as set forth in claim 1,
wherein the values of the weighted coefficients are adaptively designated corresponding to the number of pixels used for the noise reduction.

10. The imaging apparatus as set forth in claim 1,
wherein the values of the weighted coefficients are adaptively designated corresponding to illumination of an object.

11. A noise reduction apparatus, comprising:
extracting means for extracting an attention pixel used for the noise reduction and a plurality of adjacent pixels of the same color component as the attention pixel;
edge detecting means for detecting whether there is an edge between the attention pixel and the plurality of adjacent pixels;
determining means for determining that the adjacent pixels be able to be used for the noise reduction when the edge detecting means has not detected an edge and determining that the adjacent pixels be not able to be used for the noise reduction when the edge detecting means has detected an edge;
first processing means for performing a first noise reduction process for a pixel value of the attention pixel and a pixel value of the adjacent pixel determined to be able to be used for the noise reduction by the determining means;
second processing means for performing a second noise reduction process for the pixel value of the attention pixel and the pixel values of the adjacent pixels determined to be able to be used for the noise reduction by the determining means while frequency characteristics are kept; and
weighted adding means for adding an output value of the first processing means to which a first weighted coefficient is applied and an output value of the second processing means to which a second weighted coefficient determined using the first weighted coefficient is applied.

12. The noise reduction apparatus as set forth in claim 11,
wherein the edge detecting means performs a second-order differentiation for the pixel value of the attention pixel and the pixel values of the adjacent pixels to detect an edge.

13. The noise reduction apparatus as set forth in claim 12, further comprising:
smoothening means for smoothening the attention pixel and the plurality of adjacent pixels in a direction perpendicular to a direction in which the second-order differentiation is performed for these pixels; and
interpolating means for interpolating a defect pixel if there is the defect pixel in a direction of the second-order differentiation.

14. The noise reduction apparatus as set forth in claim 11,
wherein an adjacent pixel which is point-symmetrical to the adjacent pixels determined to be able to be used for the noise reduction by the determining means with respect to the attention pixel is determined to be able to be used for the noise reduction.

15. The noise reduction apparatus as set forth in claim 11,
wherein the edge detecting means is means for detecting an edge with the pixel value of the attention pixel and the pixel values of the adjacent pixels which are point-symmetrical with respect to the attention pixel.

16. The noise reduction apparatus as set forth in claim 11,
wherein the first processing means outputs a mean value of the pixel value of the attention pixel and the pixel values of the adjacent pixels determined to be able to be used for the noise reduction by the determining means, and
wherein the second processing means selects a pixel value of a nearly median value of the pixel value of the attention pixel and the pixel values of the adjacent pixels determined to be able to be used for the noise reduction by the determining means and outputs the selected pixel value.

17. The noise reduction apparatus as set forth in claim 11,
wherein the first processing means is arithmetic mean calculating means for calculating a mean value of the pixel value of the attention pixel and the pixel values of the adjacent pixels determined to be able to be used for the noise reduction by the determining means, and
wherein the second processing means is a median filter.

18. The noise reduction apparatus as set forth in claim 11, further comprising:
output means for substituting the pixel value of the attention pixel with a value obtained by the weighted adding means and outputting the obtained value.

19. The noise reduction apparatus as set forth in claim 11,
wherein the values of the weighted coefficients are adaptively designated corresponding to the number of pixels used for the noise reduction.

20. A noise reduction method, comprising the steps of:
extracting, by a processor, an attention pixel used for the noise reduction and a plurality of adjacent pixels of the same color component as the attention pixel;
detecting whether there is an edge between the attention pixel and the plurality of adjacent pixels;
determining that the adjacent pixels be able to be used for the noise reduction when an edge has not been detected at the edge detecting step and determining that the adjacent pixels be not able to be used for the noise reduction when an edge has been detected at the edge detecting step;
performing a first noise reduction process for a pixel value of the attention pixel and a pixel value of the adjacent pixel determined to be able to be used for the noise reduction at the determining step;
performing a second noise reduction process for the pixel value of the attention pixel and the pixel values of the adjacent pixels determined to be able to be used for the noise reduction at the determining step while frequency characteristics are kept; and
adding an output value at the first processing step to which a first weighted coefficient is applied and an output value at the second processing step to which a second weighted coefficient determined using the first weighted coefficient is applied.

21. The noise reduction method as set forth in claim 20,
wherein the first processing step is performed by outputting a mean value of the pixel value of the attention pixel and the pixel values of the adjacent pixels determined to be able to be used for the noise reduction at the determining step, and
wherein the second processing step is performed by selecting a nearly median value of the pixel value of the attention pixel and the pixel values of the adjacent pixels determined to be able to be used for the noise reduction at the determining step and outputting the selected pixel value.

22. A non-transitory record medium which is computer-readable and recorded with a program which causes a computer to execute a noise reduction method, comprising the steps of:

wherein the second processing means is a median filter extracting an attention pixel used for the noise reduction and a plurality of adjacent pixels of the same color component as the attention pixel;

detecting whether there is an edge between the attention pixel and the plurality of adjacent pixels;

determining that the adjacent pixels be able to be used for the noise reduction when an edge has not been detected at the edge detecting step and determining that the adjacent pixels be not able to be used for the noise reduction when an edge has been detected at the edge detecting step;

performing a first noise reduction process for a pixel value of the attention pixel and a pixel value of the adjacent pixel determined to be able to be used for the noise reduction at the determining step;

performing a second noise reduction process for the pixel value of the attention pixel and the pixel values of the adjacent pixels determined to be able to be used for the noise reduction at the determining step while frequency characteristics are kept; and adding an output value at the first processing step to which a first weighted coefficient is applied and an output value at the second processing step to which a second weighted coefficient determined using the first weighted coefficient is applied.

23. An imaging apparatus having an imaging section and a noise reduction device which performs noise reduction for an image signal obtained from the imaging section, the noise reduction device comprising:

extracting means for extracting an attention pixel used for the noise reduction and a plurality of adjacent pixels of the same color component as the attention pixel;

edge detecting means for detecting whether there is an edge between the attention pixel and the plurality of adjacent pixels;

determining means for determining that the adjacent pixels be able to be used for the noise reduction when the edge detecting means has not detected an edge and determining that the adjacent pixels be not able to be used for the noise reduction when the edge detecting means has detected an edge;

isolated point determining means for determining whether the attention pixel is an isolated point;

first processing means for performing a first noise reduction process with the pixel value of the attention pixel and the pixel values of the adjacent pixels determined to be able to be used for the noise reduction by the determining means;

second processing means for performing a second noise reduction process with the pixel value of the attention pixel and the pixel values of the adjacent pixels determined to be able to be used for the noise reduction by the determining means while frequency characteristics are kept;

weighted adding means for adding an output value of the first processing means and an output value of the second processing means with a weighted coefficient, and third processing means for performing a third noise reduction process with the pixel value of the attention pixel, the pixel values of the adjacent pixels determined to be able to be used for the noise reduction by the determining means, and the pixel values of the adjacent pixels determined to be not able to be used for the noise reduction by the determining means while keeping frequency characteristics, wherein when the isolated point determining means has determined that the attention pixel be not the isolated point, an output value of the weighted adding means is substituted for the pixel value of the attention pixel and the substituted value is output and when the isolated point determination means has determined that the attention pixel be the isolated point, an output value of the third processing means is substituted for the pixel value of the attention pixel and the substituted value is output.

24. The imaging apparatus as set forth in claim 23, wherein when the determining means has determined that all the adjacent pixels be not able to be used for the noise reduction, the isolated point determining means determines that the attention pixel be the isolated point.

25. The imaging apparatus as set forth in claim 23, wherein the edge detecting means performs a second-order differentiation for the pixel value of the attention pixel and the pixel values of the adjacent pixels to detect an edge.

26. The imaging apparatus as set forth in claim 25, further comprising:

smoothening means for smoothening the attention pixel and the plurality of adjacent pixels in a direction perpendicular to a direction in which the second-order differentiation is performed for these pixels; and interpolating means for interpolating a defect pixel if there is the defect pixel in a direction of the second-order differentiation.

27. The imaging apparatus as set forth in claim 23, wherein an adjacent pixel which is point-symmetrical to the adjacent pixels determined to be able to be used for the noise reduction by the determining means with respect to the attention pixel is determined to be able to be used for the noise reduction.

28. The imaging apparatus as set forth in claim 23, wherein the edge detecting means is means for detecting an edge with the pixel value of the attention pixel and the pixel values of the adjacent pixels which are point-symmetrical with respect to the attention pixel.

29. The imaging apparatus as set forth in claim 23, wherein the first processing means outputs a mean value of the pixel value of the attention pixel and the pixel values of the adjacent pixels determined to be able to be used for the noise reduction by the determining means, wherein the second processing means selects a pixel value of a nearly median value of the pixel value of the attention pixel and the pixel values of the adjacent pixels determined to be able to be used for the noise reduction by the determining means and outputs the selected pixel value, and wherein the third processing means selects a pixel value as a nearly median value of the pixel value of the attention pixel, the pixel values of the adjacent pixels determined to be able to be used for the noise reduction by the determining means, and the pixel values of the adjacent pixels determined to be not able to be used for the noise reduction by the determining means and outputs the selected pixel value.

30. The imaging apparatus as set forth in claim 23, wherein the first processing means is arithmetic mean calculating means for calculating a mean value of the pixel value of the attention pixel and the pixel values of the adjacent pixels determined to be able to be used for the noise reduction by the determining means, and

31. The imaging apparatus as set forth in claim 23, wherein the third processing means is a median filter.

32. The imaging apparatus as set forth in claim 23, wherein the values of the weighted coefficients are adaptively designated corresponding to the number of pixels used for the noise reduction.

33. The imaging apparatus as set forth in claim 23, wherein the values of the weighted coefficients are adaptively designated corresponding to illumination of an object.

34. A noise reduction apparatus, comprising:

extracting means for extracting an attention pixel used for the noise reduction and a plurality of adjacent pixels of the same color component as the attention pixel;

edge detecting means for detecting whether there is an edge between the attention pixel and the plurality of adjacent pixels;

determining means for determining that the adjacent pixels be able to be used for the noise reduction when the edge detecting means has not detected an edge and determining that the adjacent pixels be not able to be used for the noise reduction when the edge detecting means has detected an edge;

isolated point determining means for determining whether the attention pixel is an isolated point;

first processing means for performing a first noise reduction process with the pixel value of the attention pixel and the pixel values of the adjacent pixels determined to be able to be used for the noise reduction by the determining means;

second processing means for performing a second noise reduction process with the pixel value of the attention pixel and the pixel values of the adjacent pixels determined to be able to be used for the noise reduction by the determining means while frequency characteristics are kept;

weighted adding means for adding an output value of the first processing means and an output value of the second processing means with a weighted coefficient, and third processing means for performing a third noise reduction process with the pixel value of the attention pixel, the pixel values of the adjacent pixels determined to be able to be used for the noise reduction by the determining means, and the pixel values of the adjacent pixels determined to be not able to be used for the noise reduction by the determining means while keeping frequency characteristics, wherein when the isolated point determining means has determined that the attention pixel be not the isolated point, an output value of the weighted adding means is substituted for the pixel value of the attention pixel and the substituted value is output and when the isolated point determination means has determined that the attention pixel be the isolated point, an output value of the third processing means is substituted for the pixel value of the attention pixel and the substituted value is output.

35. The noise reduction apparatus as set forth in claim 34, wherein when the determining means has determined that all the adjacent pixels be not able to be used for the noise reduction, the isolated point determining means determines that the attention pixel be the isolated point.

36. The noise reduction apparatus as set forth in claim 34, wherein the edge detecting means performs a second-order differentiation for the pixel value of the attention pixel and the pixel values of the adjacent pixels to detect an edge.

37. The noise reduction apparatus as set forth in claim 36, further comprising:

smoothening means for smoothening the attention pixel and the plurality of adjacent pixels in a direction perpendicular to a direction in which the second-order differentiation is performed for these pixels; and interpolating means for interpolating a defect pixel if there is the defect pixel in a direction of the second-order differentiation.

38. The noise reduction apparatus as set forth in claim 34, wherein an adjacent pixel which is point-symmetrical to the adjacent pixels determined to be able to be used for the noise reduction by the determining means with respect to the attention pixel is determined to be able to be used for the noise reduction.

39. The noise reduction apparatus as set forth in claim 34, wherein the edge detecting means is means for detecting an edge with the pixel value of the attention pixel and the pixel values of the adjacent pixels which are point-symmetrical with respect to the attention pixel.

40. The noise reduction apparatus as set forth in claim 34, wherein the first processing means outputs a mean value of the pixel value of the attention pixel and the pixel values of the adjacent pixels determined to be able to be used for the noise reduction by the determining means, wherein the second processing means selects a pixel value of a nearly median value of the pixel value of the attention pixel and the pixel values of the adjacent pixels determined to be able to be used for the noise reduction by the determining means and outputs the selected pixel value, and wherein the third processing means selects a pixel value as a nearly median value of the pixel value of the attention pixel, the pixel values of the adjacent pixels determined to be able to be used for the noise reduction by the determining means, and the pixel values of the adjacent pixels determined to be not able to be used for the noise reduction by the determining means and outputs the selected pixel value.

41. The noise reduction apparatus as set forth in claim 34, wherein the first processing means is arithmetic mean calculating means for calculating a mean value of the pixel value of the attention pixel and the pixel values of the adjacent pixels determined to be able to be used for the noise reduction by the determining means, and wherein the second processing means is a median filter.

42. The noise reduction apparatus as set forth in claim 34, wherein the third processing means is a median filter.

43. The noise reduction apparatus as set forth in claim 34, wherein the values of the weighted coefficients are adaptively designated corresponding to the number of pixels used for the noise reduction.

44. A noise reduction method, comprising the steps of:

extracting, by a processor, an attention pixel used for the noise reduction and a plurality of adjacent pixels of the same color component as the attention pixel;

detecting whether there is an edge between the attention pixel and the plurality of adjacent pixels;

determining that the adjacent pixels be able to be used for the noise reduction when an edge has not been detected at the edge detecting step and determining that the adjacent pixels be not able to be used for the noise reduction when an edge has been detected at the edge detecting step;

determining whether the attention pixel is an isolated point;

performing a first noise reduction process with the pixel value of the attention pixel and the pixel values of the adjacent pixels determined to be able to be used for the noise reduction at the determining step;

performing a second noise reduction process with the pixel value of the attention pixel and the pixel values of the adjacent pixels determined to be able to be used for the noise reduction at the determining step while frequency characteristics are kept;

adding an output value at the first processing step and an output value at the second processing step with a weighted coefficient, and performing a third noise reduction process with the pixel value of the attention pixel, the pixel values of the adjacent pixels determined to be able to be used for the noise reduction at the determining step, and the pixel values of the adjacent pixels determined to be not able to be used for the noise reduction at the determining step while keeping frequency characteristics, wherein when it has been determined that the attention pixel be not the isolated point at the isolated point determining step, an output value at the weighted adding step is substituted for the pixel value of the attention pixel and the substituted value is output and when it has been determined that the attention pixel be the isolated point at the isolated point determination step, an output value at the third processing step is substituted for the pixel value of the attention pixel and the substituted value is output.

45. The noise reduction method as set forth in claim 44, wherein the first processing step is performed by outputting a mean value of the pixel value of the attention pixel and the pixel values of the adjacent pixels determined to be able to be used for the noise reduction at the determining step, wherein the second processing step is performed by selecting a nearly median value of the pixel value of the attention pixel and the pixel values of the adjacent pixels determined to be able to be used for the noise reduction at the determining step and outputting the selected pixel value, and wherein the third processing step is performed by selecting a nearly median value of the pixel value of the attention pixel, the pixel values of the adjacent pixels determined to be able to be used for the noise reduction at the determining step, and the pixel values of the adjacent pixels determined to be not able to be used for the noise reduction at the determining step and outputting the selected value.

46. A non-transitory record medium which is computer-readable and recorded with a program which causes a computer to execute a noise reduction method, comprising the steps of:

extracting an attention pixel used for the noise reduction and a plurality of adjacent pixels of the same color component as the attention pixel;

detecting whether there is an edge between the attention pixel and the plurality of adjacent pixels;

determining that the adjacent pixels be able to be used for the noise reduction when an edge has not been detected at the edge detecting step and determining that the adjacent pixels be not able to be used for the noise reduction when an edge has been detected at the edge detecting step;

determining whether the attention pixel is an isolated point;

performing a first noise reduction process with the pixel value of the attention pixel and the pixel values of the adjacent pixels determined to be able to be used for the noise reduction at the determining step;

performing a second noise reduction process with the pixel value of the attention pixel and the pixel values of the adjacent pixels determined to be able to be used for the noise reduction at the determining step while frequency characteristics are kept;

adding an output value at the first processing step and an output value at the second processing step with a weighted coefficient, and performing a third noise reduction process with the pixel value of the attention pixel, the pixel values of the adjacent pixels determined to be able to be used for the noise reduction at the determining step, and the pixel values of the adjacent pixels determined to be not able to be used for the noise reduction at the determining step while keeping frequency characteristics, wherein when it has been determined that the attention pixel be not the isolated point at the isolated point determining step, an output value at the weighted adding step is substituted for the pixel value of the attention pixel and the substituted value is output and when it has been determined that the attention pixel be the isolated point at the isolated point determination step, an output value at the third processing step is substituted for the pixel value of the attention pixel and the substituted value is output.

* * * * *

UNITED STATES PATENT AND TRADEMARK OFFICE
CERTIFICATE OF CORRECTION

PATENT NO. : 7,834,917 B2
APPLICATION NO. : 11/665037
DATED : November 16, 2010
INVENTOR(S) : Hiroyuki Kinoshita et al.

Page 1 of 1

It is certified that error appears in the above-identified patent and that said Letters Patent is hereby corrected as shown below:

On the Title Page, under item (86), "PCT No.: PCT/JP2006/016062" should read
--PCT No.: PCT/JP2006/316062--

Signed and Sealed this
First Day of March, 2011

David J. Kappos
*Director of the United States Patent and Trademark Office*